US010585329B2

(12) United States Patent
Nakanishi et al.

(10) Patent No.: US 10,585,329 B2
(45) Date of Patent: Mar. 10, 2020

(54) PHOTODETECTOR AND DISPLAY DEVICE

(71) Applicant: Japan Display Inc., Minato-ku (JP)

(72) Inventors: Takayuki Nakanishi, Tokyo (JP); Tatsuya Yata, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/917,961

(22) Filed: Mar. 12, 2018

(65) Prior Publication Data

US 2018/0267385 A1 Sep. 20, 2018

(30) Foreign Application Priority Data

Mar. 14, 2017 (JP) ................. 2017-048581

(51) Int. Cl.
*G02F 1/29* (2006.01)
*G02F 1/133* (2006.01)
*G02F 1/1335* (2006.01)
*G02F 1/1343* (2006.01)
*G02F 1/1333* (2006.01)

(52) U.S. Cl.
CPC ............ *G02F 1/29* (2013.01); *G02F 1/13318* (2013.01); *G02F 1/13439* (2013.01); *G02F 1/133345* (2013.01); *G02F 1/133512* (2013.01); *G02F 1/133553* (2013.01); *G02F 1/134309* (2013.01); *G02F 2001/13312* (2013.01); *G02F 2201/121* (2013.01); *G02F 2201/123* (2013.01); *G02F 2201/16* (2013.01)

(58) Field of Classification Search
CPC ........................................................ G02F 1/29
See application file for complete search history.

(56) References Cited

U.S. PATENT DOCUMENTS

2011/0069254 A1\* 3/2011 Takama ................... G02B 3/14
 349/62
2011/0269266 A1\* 11/2011 Yamazaki ......... H01L 21/02554
 438/104
2013/0222713 A1\* 8/2013 Park ................... G02B 27/2264
 349/15

FOREIGN PATENT DOCUMENTS

JP 2007-264321 10/2007

\* cited by examiner

*Primary Examiner* — Edmond C Lau
(74) *Attorney, Agent, or Firm* — Oblon, McClelland, Maier & Neustadt, L.L.P.

(57) ABSTRACT

According to one embodiment, a photodetector includes a sensor unit including at least one photosensor, a liquid crystal element including a first substrate includes a plurality of first control electrodes, a second substrate including a second control electrode, and a liquid crystal layer held between the first substrate and the second substrate, a liquid crystal controller which controls a voltage to be applied to the liquid crystal layer for forming a first lens that is opposed to the photosensor in the liquid crystal layer, and a sensor controller which controls the sensor unit.

4 Claims, 21 Drawing Sheets

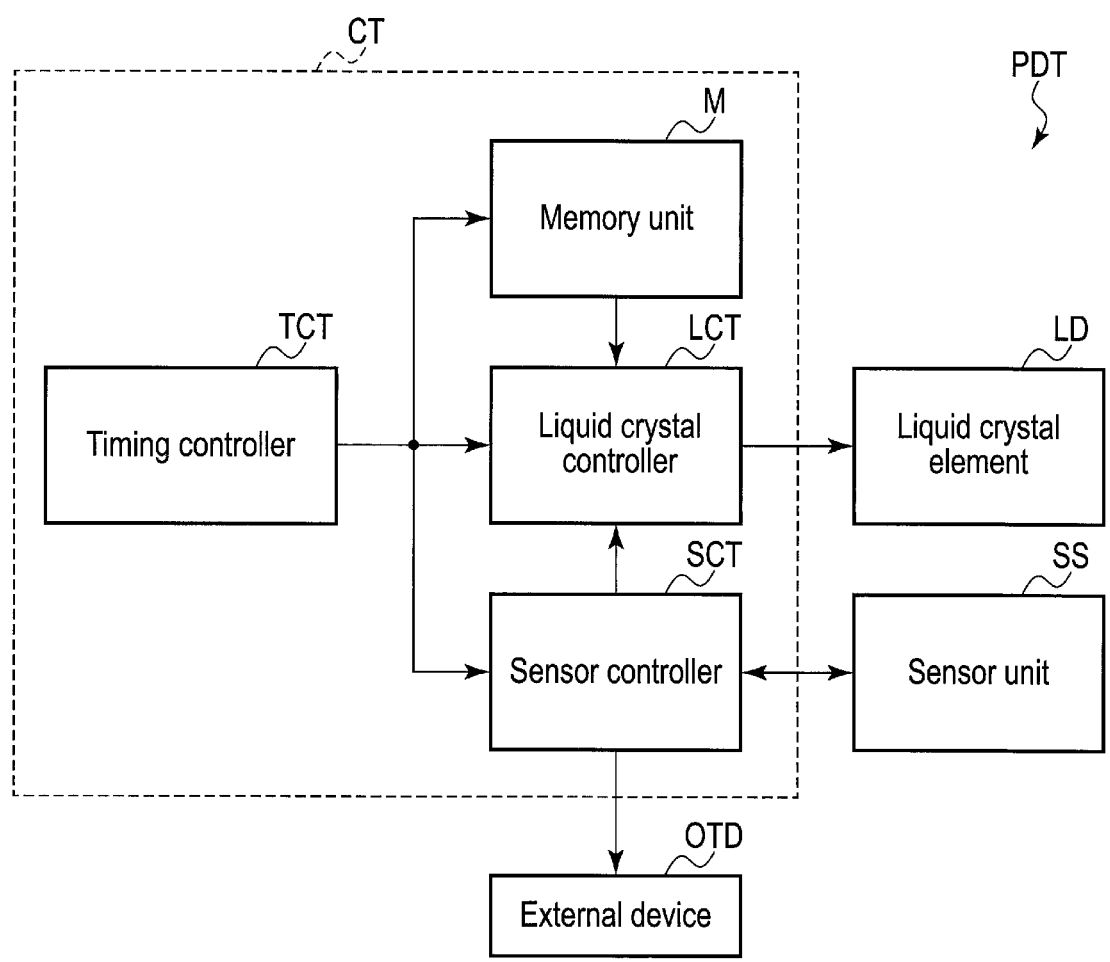
F I G. 1

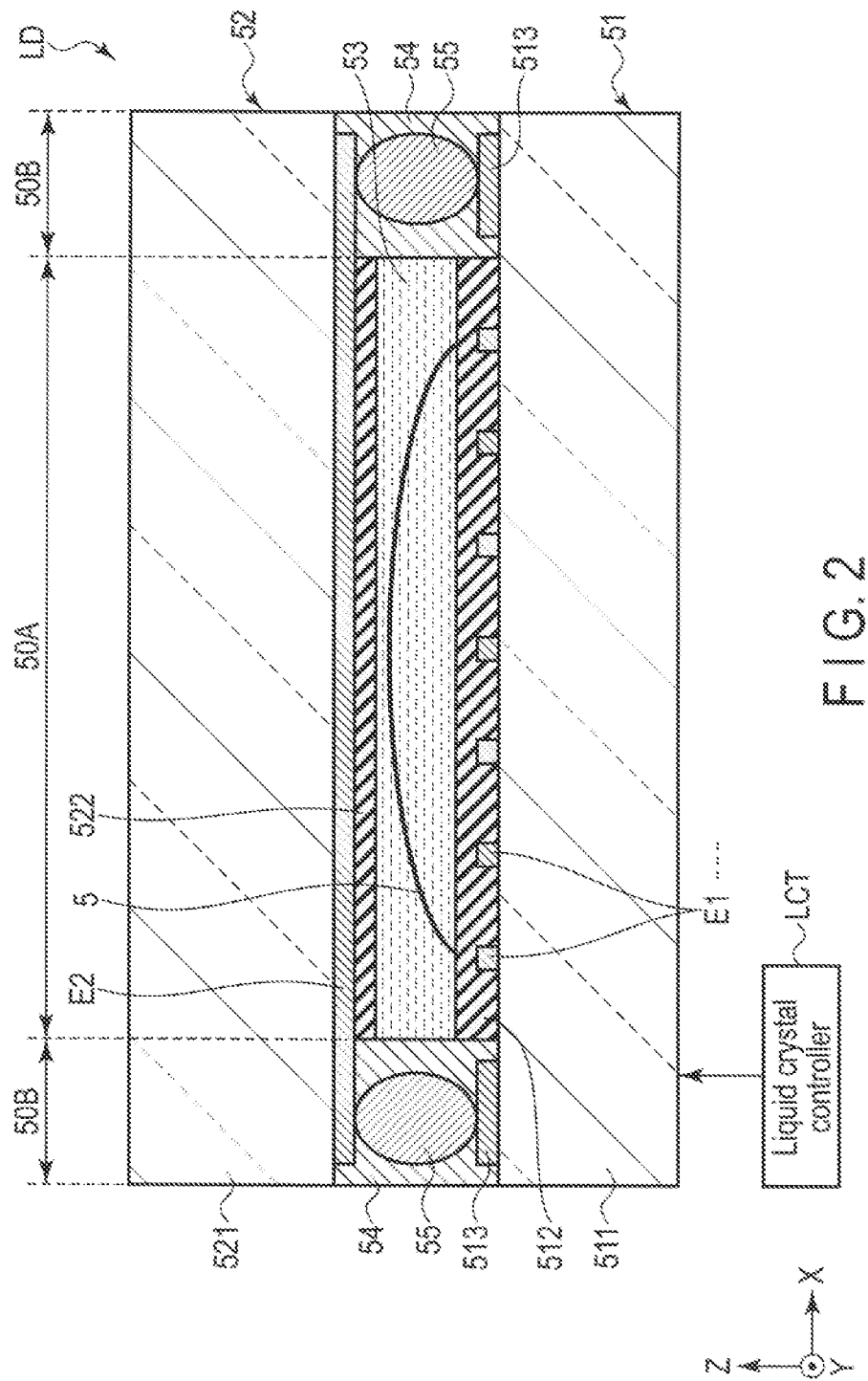
F I G. 2

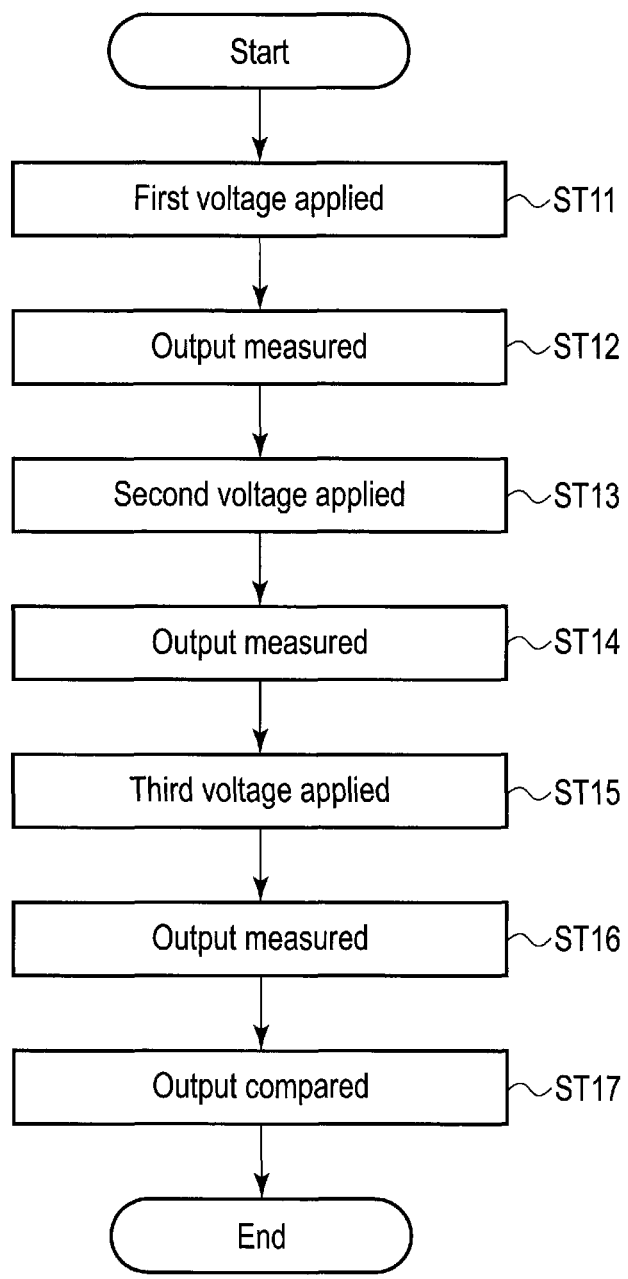
F I G. 8

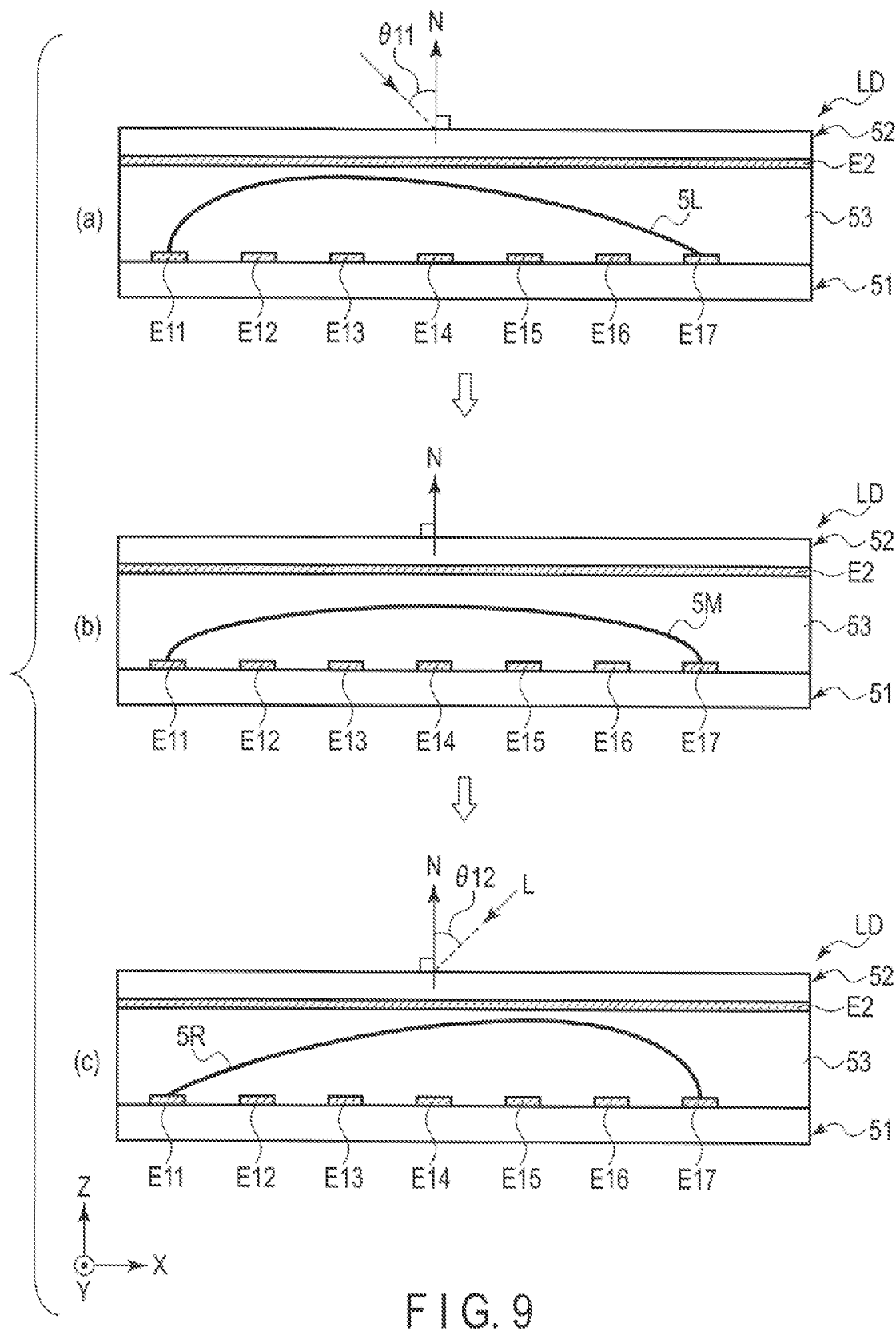
F I G. 9

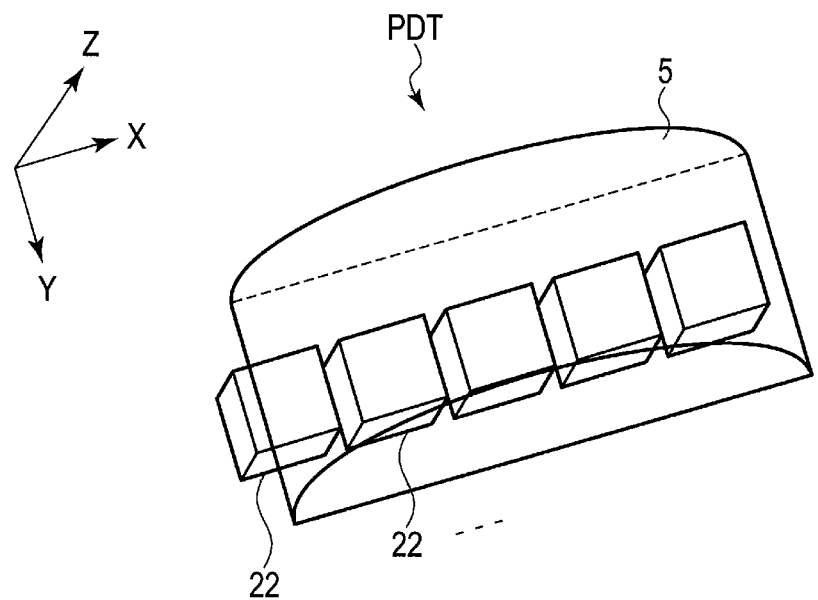
F I G. 11
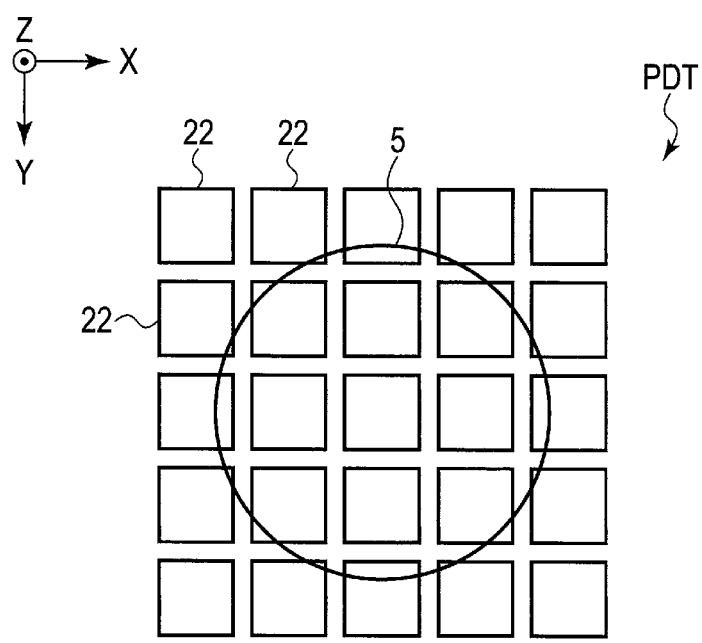
F I G. 12

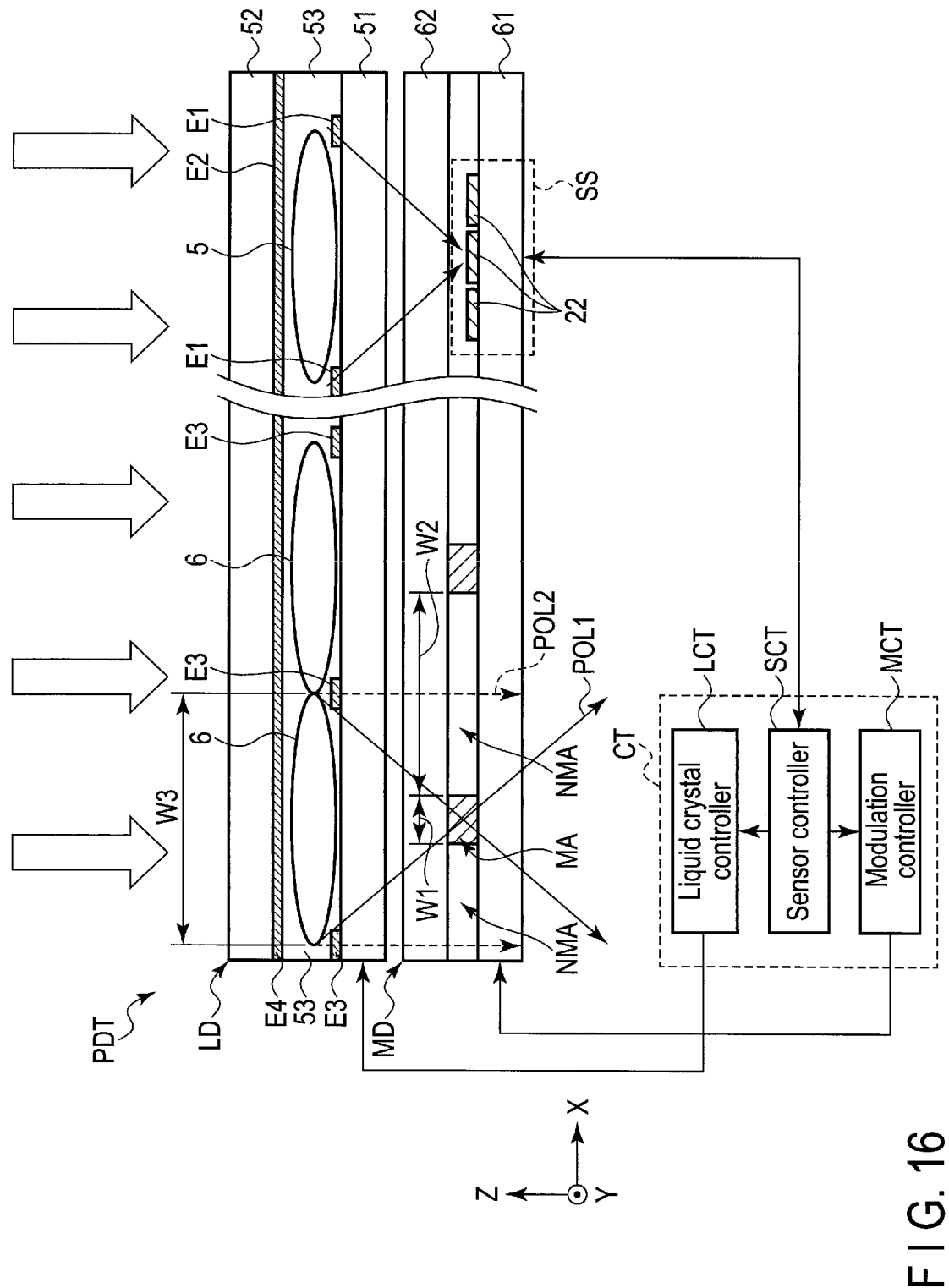
F I G. 16

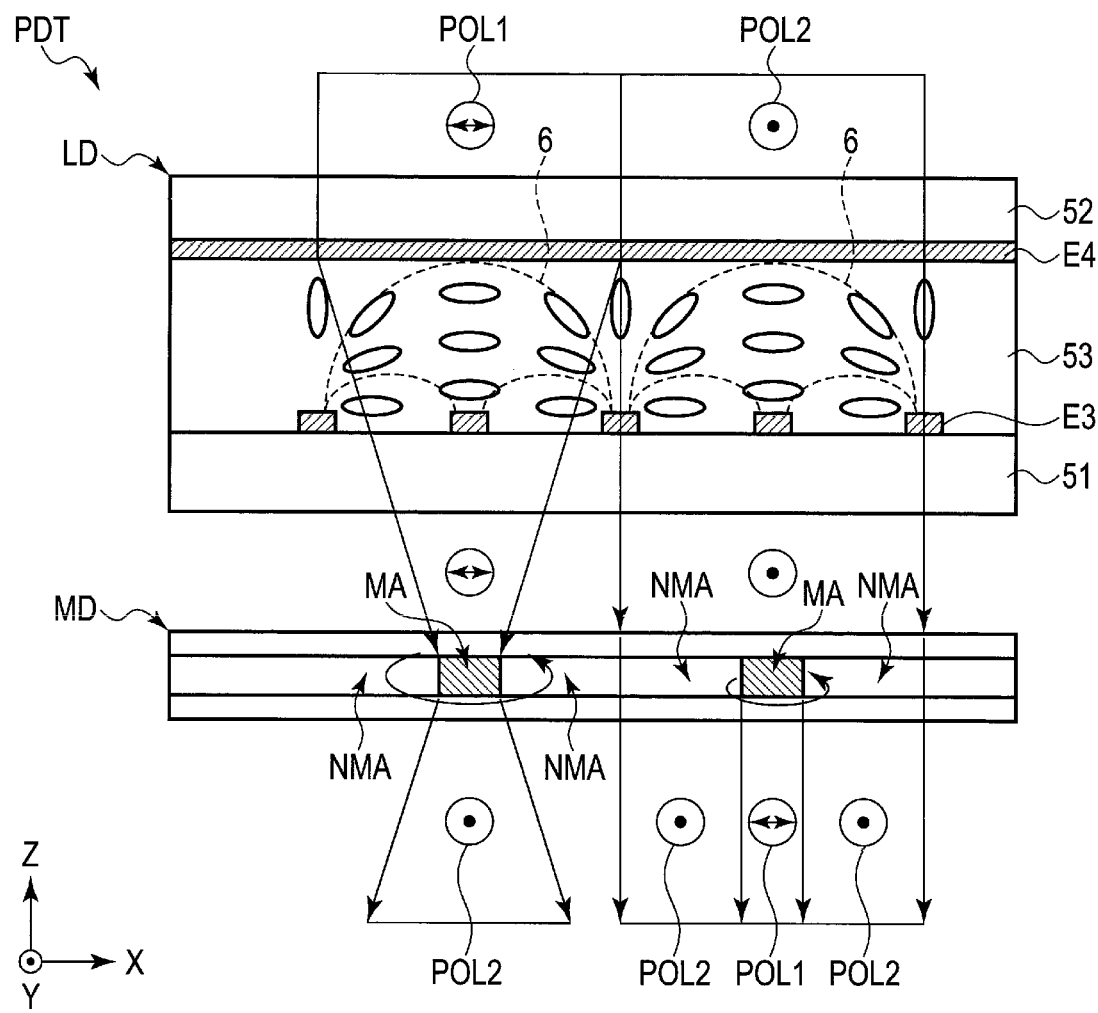
F I G. 17

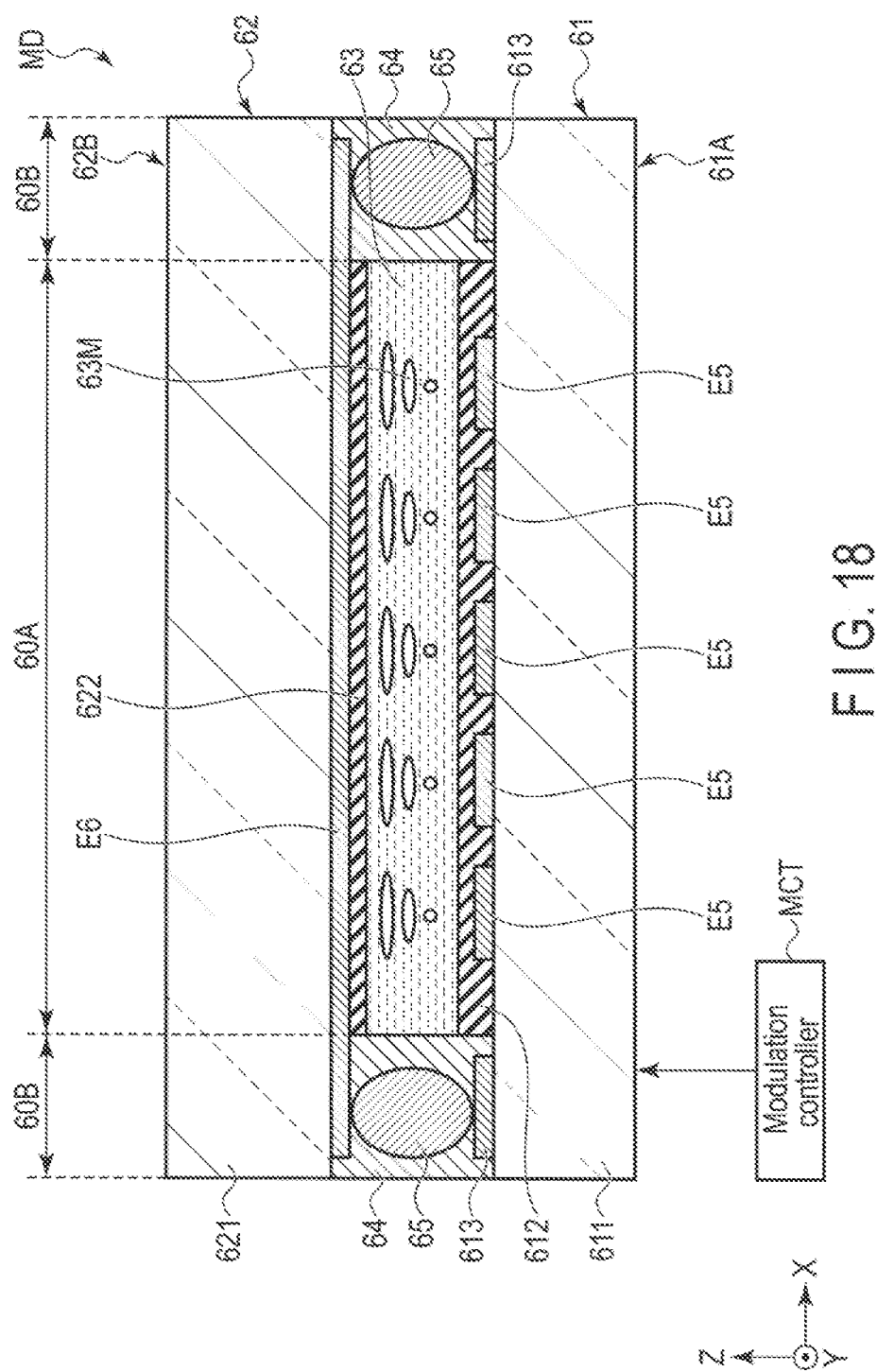
F I G. 18

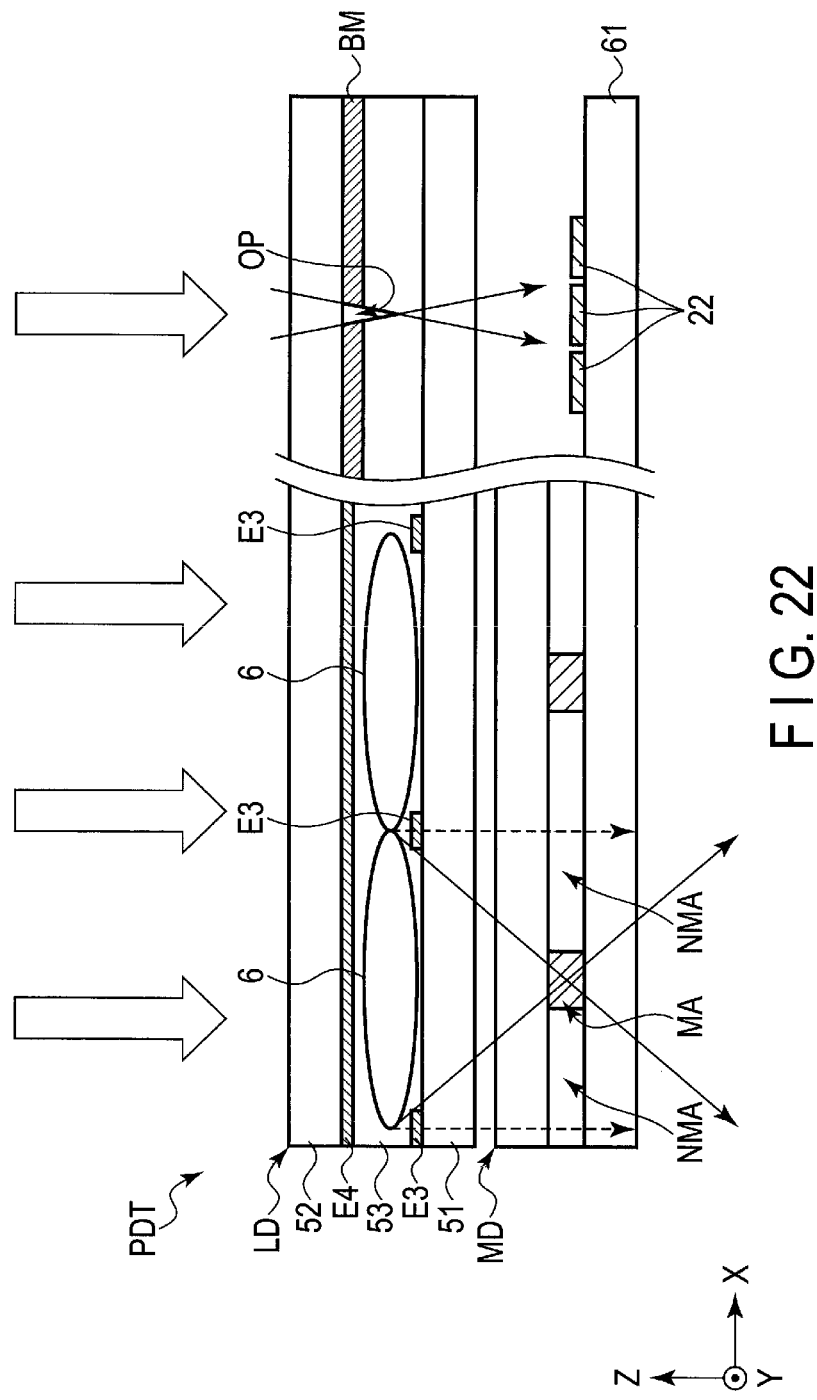
F I G. 22

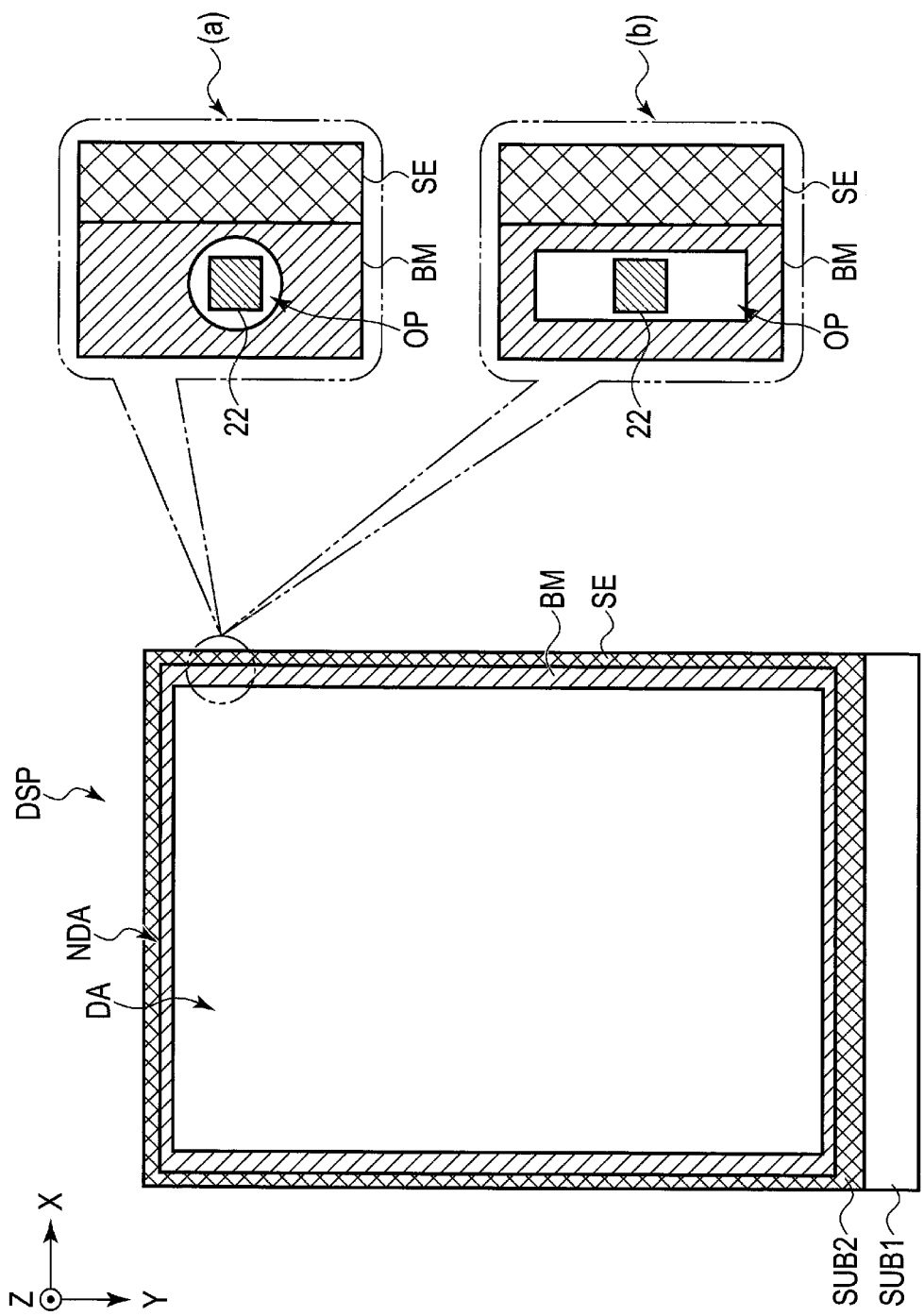
F I G. 24

PHOTODETECTOR AND DISPLAY DEVICE

CROSS-REFERENCE TO RELATED APPLICATIONS

This application is based upon and claims the benefit of priority from Japanese Patent Application No. 2017-048581, filed Mar. 14, 2017, the entire contents of which are incorporated herein by reference.

FIELD

Embodiments described herein relate generally to a photodetector and a display device.

BACKGROUND

For example, an image display device comprising a diffusion-control liquid crystal panel and a liquid crystal display panel has been proposed. The diffusion-control liquid crystal panel can switch a state between a lens formation state of diffusing linearly polarized light, oscillating in a predetermined direction, of light having directivity in a specific direction, and a non-lens formation state of transmitting the light while maintaining the directivity of the light. In the lens formation state, a plurality of liquid crystal micro-lenses are formed by applying a voltage to a liquid crystal layer.

BRIEF DESCRIPTION OF THE DRAWINGS

FIG. 1 is a block diagram showing a configuration example of a photodetector PDT of the present embodiment.

FIG. 2 is a cross-sectional view showing a configuration example of a liquid crystal element LD.

FIG. 8 is a flowchart for explaining an example of control of the photodetector PDT.

FIG. 9 is an illustration showing an example of a first lens formed in the liquid crystal layer 53.

FIG. 11 is an illustration showing yet another configuration example of the photodetector PDT of the present embodiment.

FIG. 12 is an illustration showing yet another configuration example of the photodetector PDT of the present embodiment.

FIG. 16 is an illustration showing yet another configuration example of the photodetector PDT of the present embodiment.

FIG. 17 is an illustration for explaining the function of the liquid crystal element LD and a modulation element MD shown in FIG. 16.

FIG. 18 is a cross-sectional view showing a configuration example of the modulation element MD.

FIG. 22 is an illustration showing another configuration example of the photodetector PDT of the present embodiment.

FIG. 24 is a plan view showing a configuration example of the display device DSP shown in FIG. 23.

DETAILED DESCRIPTION

Figure 3:
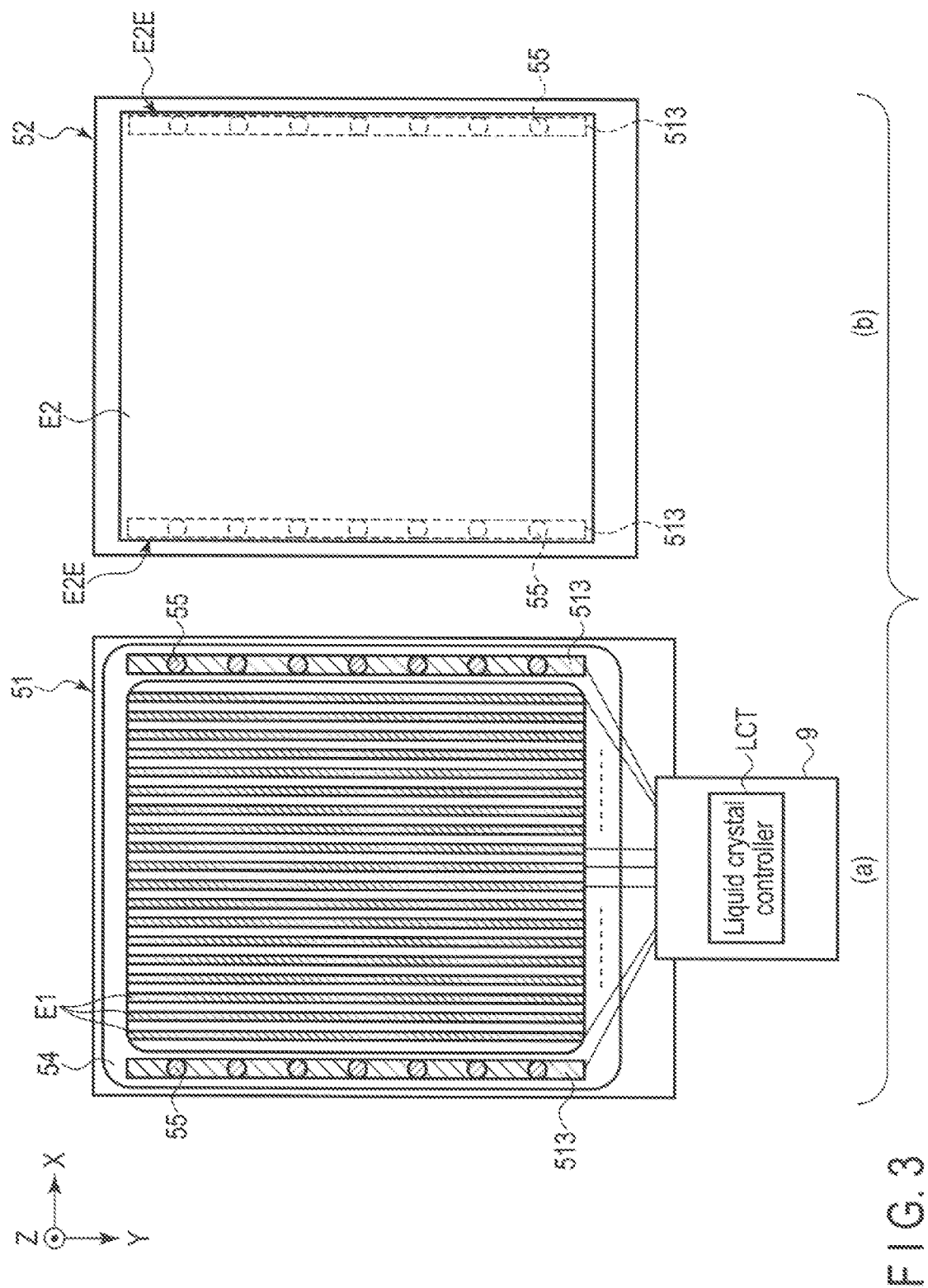
FIG. 3 is a plan view showing a configuration example of the liquid crystal element LD.

In general, according to one embodiment, a photodetector comprises: a sensor unit comprising at least one photosensor; a liquid crystal element comprising a first substrate comprising a plurality of first control electrodes, a second substrate comprising a second control electrode, and a liquid crystal layer held between the first substrate and the second substrate; a liquid crystal controller which controls a voltage to be applied to the liquid crystal layer for forming a first lens that is opposed to the photosensor in the liquid crystal layer; and a sensor controller which controls the sensor unit.

According to another embodiment, a display device comprises: a first substrate comprising a photosensor, a plurality of first control electrodes, and a pixel electrode; a second substrate comprising a light-shielding body including an opening opposed to the photosensor, a second control electrode arranged at the opening, and a common electrode; and a liquid crystal layer held between the first substrate and the second substrate, the liquid crystal layer including a first region between the photosensor and the opening, and a second region between the pixel electrode and the common electrode.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is a block diagram showing a configuration example of a photodetector PDT of the present embodiment.

The photodetector PDT comprises a sensor unit SS, a liquid crystal element LD, and a controller CT which controls the sensor unit SS and the liquid crystal element LD. Details of the sensor unit SS and the liquid crystal element LD will be described later. The controller CT comprises a timing controller TCT, a memory unit M, a liquid crystal controller LCT, and a sensor controller SCT. The timing controller TCT controls the liquid crystal controller LCT and the sensor controller SCT, on the basis of various kinds of data, etc., stored in the memory unit M. In one example, the memory unit M stores data regarding a voltage to be applied to a liquid crystal layer, which will be described later, for forming a lens of a predetermined shape in the liquid crystal layer. The liquid crystal controller LCT is configured to control the liquid crystal element LD, and applies a predetermined voltage to the liquid crystal layer, on the basis of the data stored in the memory unit M. The sensor controller SCT is configured to control the sensor unit SS, drives a photosensor provided in the sensor unit SS, and measures an output from the photosensor. Further, the sensor controller SCT outputs a measurement result of the output from the photosensor to an external device OTD. Furthermore, the sensor controller SCT outputs the measurement result to the liquid crystal controller LCT for feedback controlling the liquid crystal element LD. An example of control of each unit will be described later.

FIG. 2 is a cross-sectional view showing a configuration example of the liquid crystal element LD. While a first direction X, a second direction Y, and a third direction Z in the drawing are orthogonal to each other, they may cross each other at an angle other than 90 degrees.

The liquid crystal element LD comprises a first substrate 51, a second substrate 52, a liquid crystal layer 53, a first control electrode E1, and a second control electrode E2. In the example illustrated, the first control electrode E1 is provided on the first substrate 51, and the second control electrode E2 is provided on the second substrate 52. However, the first control electrode E1 and the second control electrode E2 may both be provided on the same substrate, that is, on the first substrate 51 or the second substrate 52.

The first substrate 51 comprises a transparent insulating substrate 511, the first control electrode E1, an alignment film 512, and a feeder 513. The first control electrode E1 is located between the insulating substrate 511 and the liquid crystal layer 53. A plurality of first control electrodes E1 are arranged at intervals in the first direction X in an effective area 50A. In one example, a width of each of the first control electrodes E1 along the first direction X is less than or equal to an interval between adjacent first control electrodes E1 along the first direction X. The alignment film 512 covers the first control electrodes E1, and is in contact with the liquid crystal layer 53. The feeder 513 is located in a non-effective area 50B outside the effective area 50A.

The second substrate 52 comprises a transparent insulating substrate 521, the second control electrode E2, and an alignment film 522. The second control electrode E2 is located between the insulating substrate 521 and the liquid crystal layer 53. The second control electrode E2 is, for example, a single plate electrode which is located on substantially the entire surface of the effective area 50A, and also extends to the non-effective area 50B. In the effective area 50A, the second control electrode E2 is opposed to the first control electrode E1 via the liquid crystal layer 53. The second control electrode E2 is opposed to the feeder 513 in the non-effective area 50B. The alignment film 522 covers the second control electrodes E2, and is in contact with the liquid crystal layer 53.

Each of the insulating substrates 511 and 521 is, for example, a glass substrate or a resin substrate. Each of the first control electrode E1 and the second control electrode E2 is formed of a transparent conductive material such as indium tin oxide (ITO) or indium zinc oxide (IZO). Each of the alignment films 512 and 522 is, for example, a horizontal alignment film, and is subjected to alignment treatment in the first direction X.

The first substrate 51 and the second substrate 52 are bonded to each other by a sealant 54 in the non-effective area 50B. The sealant 54 includes a conductive material 55. The conductive material 55 is interposed between the feeder 513 and the second control electrode E2, and electrically connects the feeder 513 and the second control electrode E2.

The liquid crystal layer 53 is held between the first substrate 51 and the second substrate 52. The liquid crystal layer 53 is formed of, for example, a liquid crystal material having the positive dielectric anisotropy. The first control electrode E1 and the second control electrode E2 apply a voltage, to the liquid crystal layer 53, for forming a first lens 5 in the liquid crystal layer 53.

The liquid crystal controller LCT controls the voltage to be applied to the liquid crystal layer 53. By controlling the voltage to be applied to each of the first control electrode E1 and the second control electrode E2, the liquid crystal controller LCT can switch a mode between a mode in which the first lens 5 is formed in the liquid crystal layer 53 and a mode in which a lens is not formed in the liquid crystal layer 53. Further, by controlling the voltage to be applied to each of the first control electrodes E1, the liquid crystal controller LCT can switch a mode between a mode in which the first lens 5 is formed at a first position of the liquid crystal layer 53 and a mode in which the first lens 5 is formed at a second position, which is different from the first position, of the liquid crystal layer 53. Furthermore, by controlling the voltage to be applied to each of the first control electrodes E1, the liquid crystal controller LCT can switch a mode between a mode in which the first lens 5 of a first shape is formed in the liquid crystal layer 53 and a mode in which the first lens 5 of a second shape, which is different from the first shape, is formed in the liquid crystal layer 53. The illustrated example corresponds to a case where a single first lens 5 is formed in the liquid crystal layer 53. However, a plurality of first lenses 5 may be formed in the liquid crystal layer 53.

FIG. 3 is a plan view showing a configuration example of the liquid crystal element LD. FIG. 3(a) is a plan view of the first substrate 51, and FIG. 3(b) is a plan view of the second substrate 52.

In the first substrate 51 shown in FIG. 3(a), the sealant 54 is formed in a frame shape. The first control electrodes E1 are located at an inner side surrounded by the sealant 54, and are arranged at intervals in the first direction X. Each of the first control electrodes E1 is, for example, a strip electrode extending in the second direction Y. Alternatively, the first control electrodes E1 may each be a strip electrode extending in the first direction X, or may be island-shaped electrodes arranged in the first direction X and the second direction Y. The shape of the island-shaped electrode is polygonal, such as rectangular or hexagonal, or circular. The feeder 513 extends in the second direction Y at a position overlapping the sealant 54. At least a part of the conductive material 55 included in the sealant 54 overlaps the feeder 513. A wiring substrate 9 is connected to the first substrate 51, and electrically connects each of the first control electrodes E1 and the feeder 513 with the liquid crystal controller LCT.

In the second substrate 52 shown in FIG. 3(b), the second control electrode E2 is formed rectangular, and includes an end portion E2E extending in the second direction Y. The end portion E2E overlaps the feeder 513 and the conductive material 55. That is, the second control electrode E2 is electrically connected to the liquid crystal controller LCT via the conductive material 55 and the feeder 513.

Figure 4:
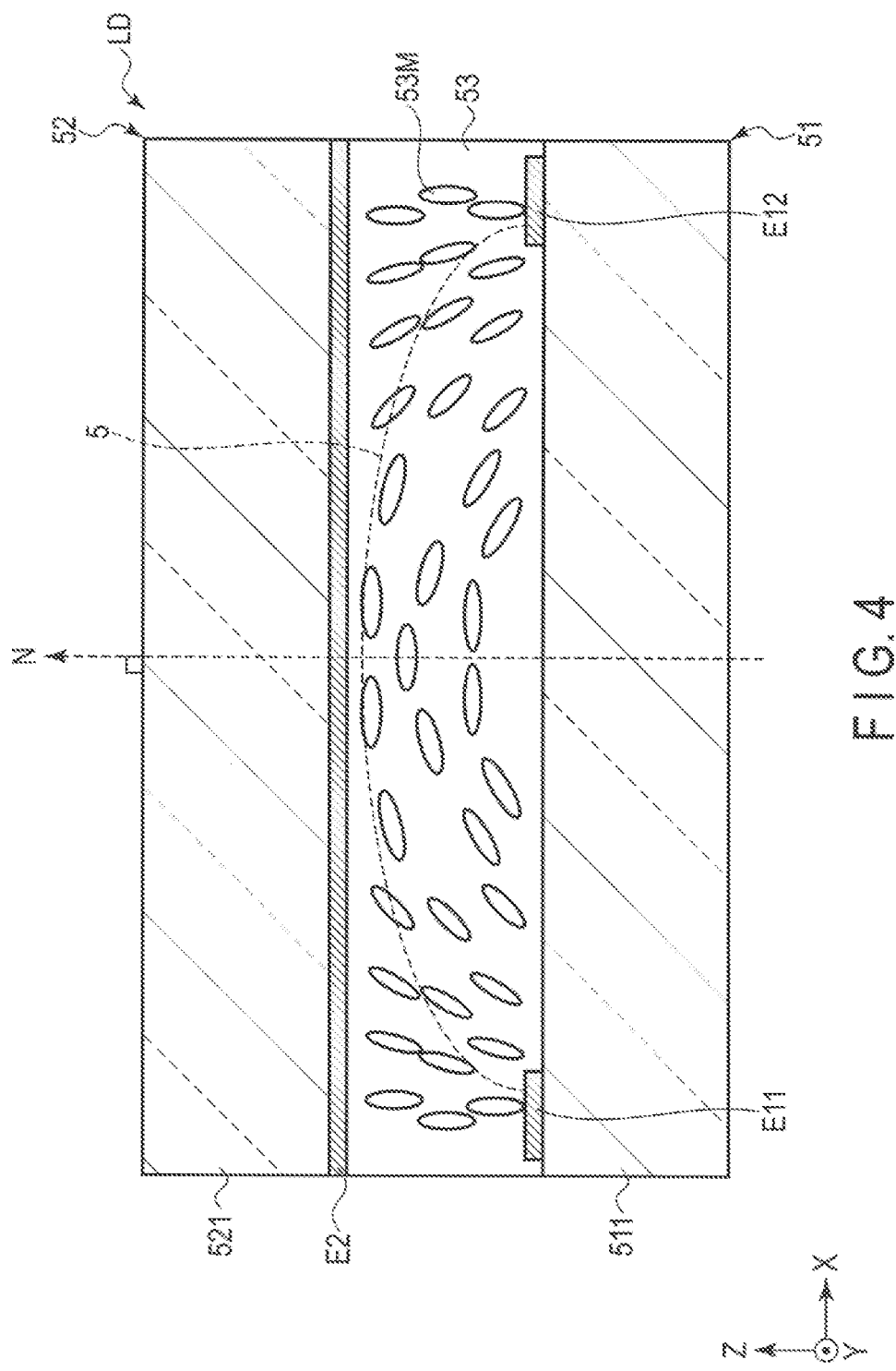
FIG. 4 is an illustration for explaining a first lens 5 formed in a liquid crystal layer 53.

FIG. 4 is an illustration for explaining the first lens 5 formed in the liquid crystal layer 53. FIG. 4 illustrates only the structures necessary for explanation. Here, a case of applying a voltage, which is different from that applied to first control electrodes E11 and E12, to the second control electrode E2 will be described.

In one example, as described above, the liquid crystal layer 53 has the positive dielectric anisotropy. Liquid crystal molecules 53M included in the liquid crystal layer 53 are initially aligned such that their major axes are aligned in the first direction X in a state where an electric field is not formed, and are aligned such that the major axes of the liquid crystal molecules 53M are aligned along an electric field in a state where the electric field is formed.

In one example, a voltage of 6V is applied to the first control electrode E11, a voltage of −6V is applied to the first control electrode E12, and a voltage of 0V is applied to the second control electrode E2. In regions in which the first control electrodes E11 and E12 are opposed to the second control electrode E2, an electric field along the third direction Z is formed. Therefore, the liquid crystal molecules 53M are aligned such that their major axes are aligned along the third direction Z. In a region between the first control electrode E11 and the first control electrode E12, an electric field which is tilted with respect to the third direction Z is formed. Therefore, the liquid crystal molecules 53M are aligned such that their major axes are tilted with respect to the third direction Z. In an intermediate region, which is a region intermediate between the first control electrode E11 and the first control electrode E12, an electric field is hardly formed or an electric field along the first direction X is formed. Therefore, the liquid crystal molecules 53M are aligned such that their major axes are aligned along the first direction X. The liquid crystal molecule 53M has refractive anisotropy Δn. Accordingly, the liquid crystal layer 53 has a refractive-index distribution according to an alignment state of the liquid crystal molecules 53M. In other words, the liquid crystal layer 53 has a retardation distribution which is represented by Δn·d or a phase distribution, where d is a thickness of the liquid crystal layer 53 along the third direction Z. Thickness d is, for example, 10 to 100 μm. The first lens 5 shown by a dotted line in the drawing is one that is formed by the refractive-index distribution, retardation distribution, or phase distribution described above. The illustrated first lens 5 functions as a convex lens. Also, the illustrated first lens 5 has a shape that is symmetrical with respect to a normal N of the liquid crystal element LD.

In the present embodiment, a system formed by combining the liquid crystal layer 53 including liquid crystal molecules which are initially aligned substantially horizontally along a substrate main surface and an electric field formed along a direction intersecting the substrate main surface has been explained, as an example of the liquid crystal element LD comprising the first lens 5. However, the liquid crystal element LD comprising the first lens 5 is not limited to the above. For example, a liquid crystal layer including liquid crystal molecules which are initially aligned substantially perpendicularly to the substrate main surface may be combined, or the liquid crystal layer 53 may be combined with an electric field formed along the substrate main surface. In other words, as long as the system can vary the refractive-index distribution according to an electric field applied to the liquid crystal layer, a liquid crystal element comprising the first lens 5 can be realized. The substrate main surface mentioned above refers to an X-Y plane defined by the first direction X and the second direction Y.

Figure 5:
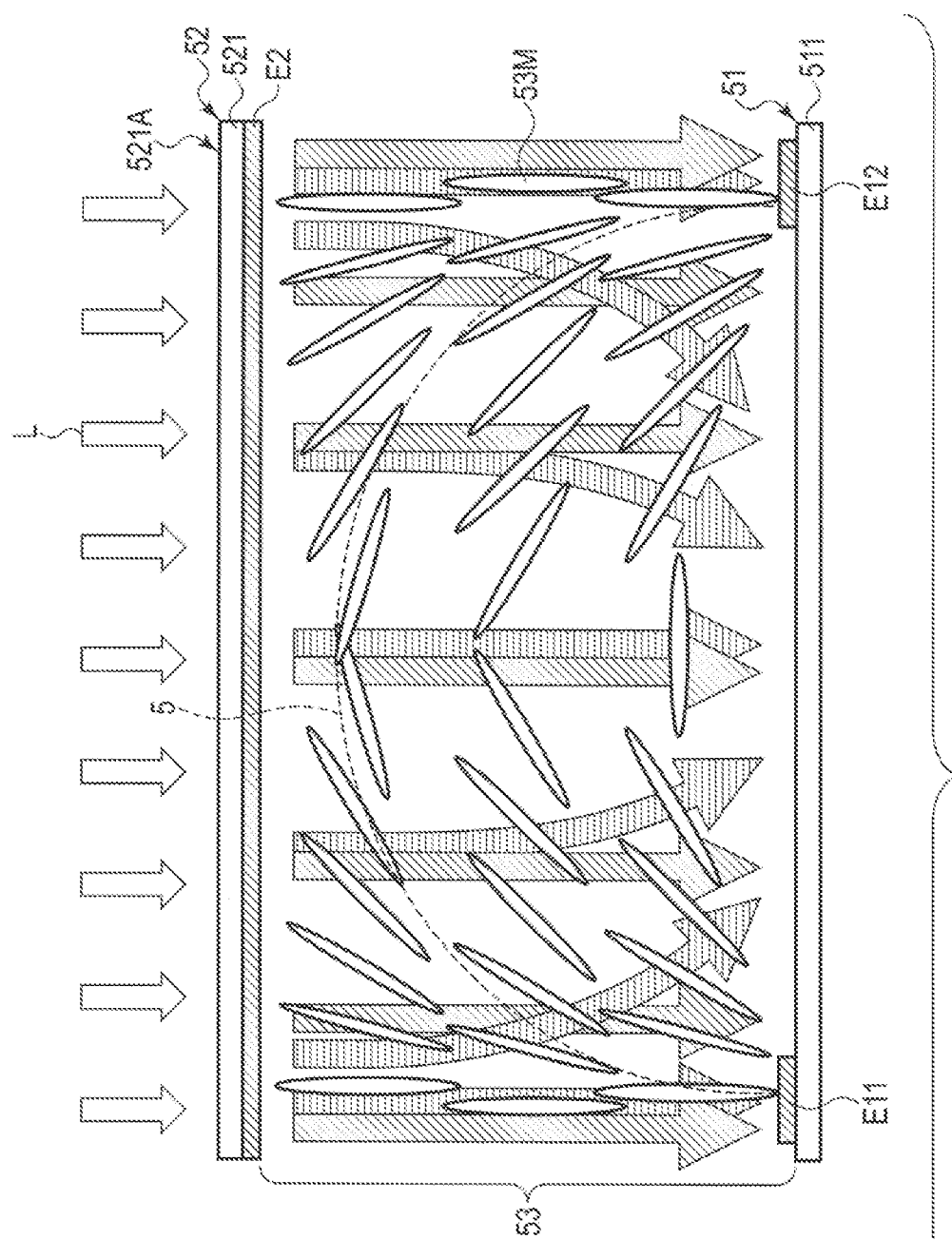
FIG. 5 is an illustration for explaining the function of the first lens 5 illustrated in FIG. 4.

FIG. 5 is an illustration for explaining the function of the first lens 5 illustrated in FIG. 4.

Here, when a traveling direction of light is along the third direction Z, linearly polarized light having an oscillation plane along the first direction X is referred to as first polarized light POL1, and linearly polarized light having an oscillation plane along the second direction Y is referred to as second polarized light POL2. Note that the traveling direction of light is opposite to a direction indicated by an arrow representing the third direction Z in the example illustrated. The first polarized light POL1 is shown by an arrow having a horizontal stripe pattern in the drawing, and the second polarized light POL2 is shown by an arrow having a slanting stripe pattern in the drawing. Light L is, for example, natural light having random oscillation planes, and is assumed to enter from an outer surface 521A of the insulating substrate 521, and travel from the second substrate 52 toward the first substrate 51.

The first lens 5 has different functions on the first polarized light POL1 and the second polarized light POL2, respectively. That is, of the natural light L, the first lens 5 transmits the second polarized light POL2 practically without refracting the second polarized light POL2, and refracts the first polarized light POL1. In other words, the first lens 5 exhibits a convergence function on mainly the first polarized light POL1.

Figure 6:
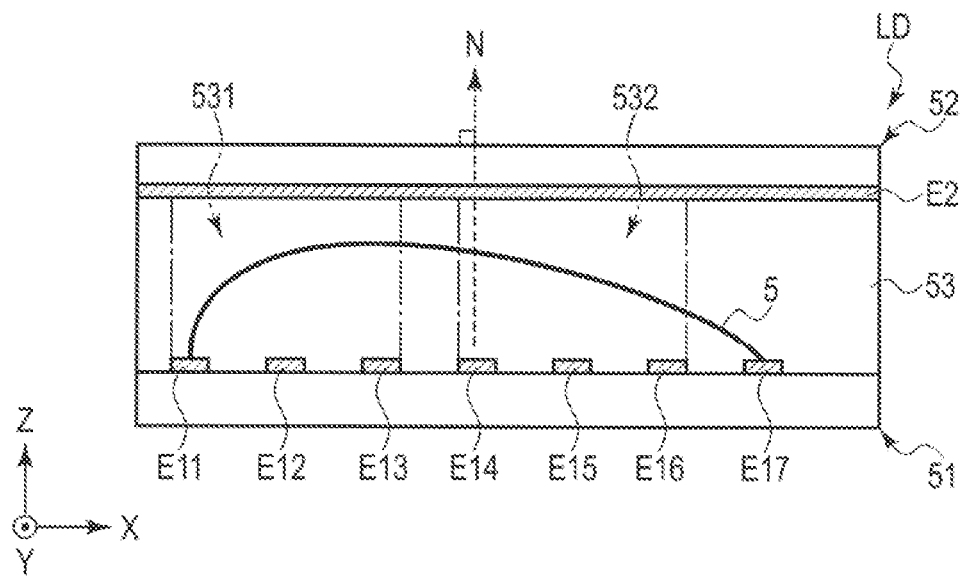
FIG. 6 is an illustration for explaining another shape of the first lens 5 formed in the liquid crystal layer 53.

FIG. 6 is an illustration for explaining another shape of the first lens 5 formed in the liquid crystal layer 53.

The illustrated first lens 5 is a lens which is unsymmetrical with respect to the normal N. In a first region 531 on the left side of the drawing, that is, the region extending over the first control electrodes E11 to E13, and a second region 532 on the right side of the drawing, that is, the region extending over the first control electrodes E14 to E16, the first lens 5 has different refractive-index distributions. Such a first lens 5 can be formed by setting the voltages of the first control electrodes E11 to E17 to, for example, 6V, 5V, 4V, 3V, 2V, 1V, and 6V, respectively, and setting the voltage of the second control electrode E2 to 0V.

Figure 7:
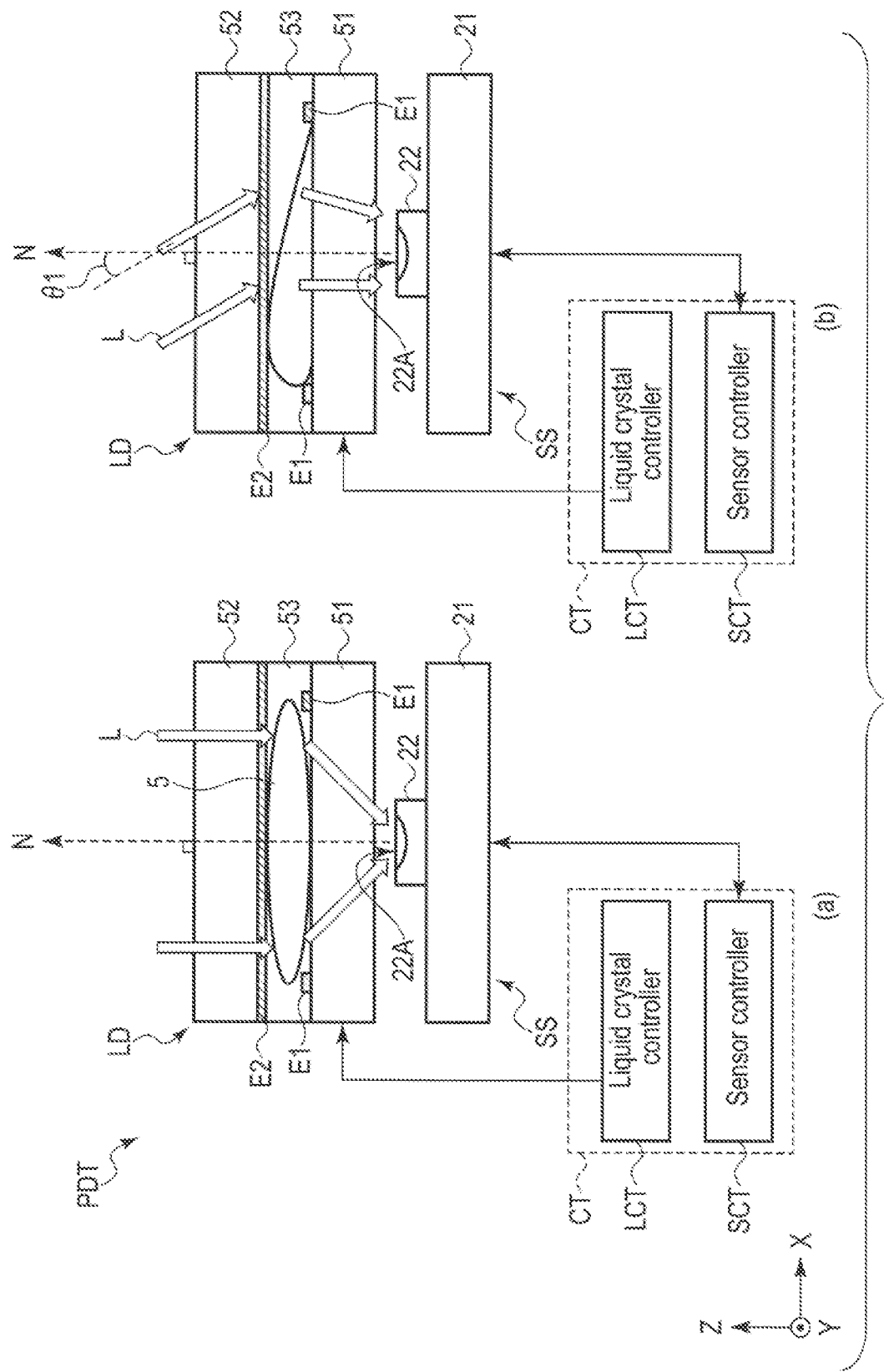
FIG. 7 is an illustration showing a configuration example of the photodetector PDT of the present embodiment.

FIG. 7 is an illustration showing a configuration example of the photodetector PDT of the present embodiment.

The sensor unit SS comprises a substrate 21, and a photosensor 22 mounted on the substrate 21. In the example illustrated, the sensor unit SS comprises a single photosensor 22, but may alternatively comprise a plurality of photosensors 22. As described above, the liquid crystal element LD comprises the first substrate 51, the second substrate 52, and the liquid crystal layer 53, and details of these elements have been explained above. The first substrate 51 and the second substrate 52 both have optical transmissivity. A light receiving surface 22A of the photosensor 22 is located directly under the first substrate 51. The light receiving surface 22A may be spaced apart from the first substrate 51 or may be in contact with the first substrate 51. The first lens 5 formed in the liquid crystal layer 53 is opposed to the photosensor 22. The photosensor 22 is arranged at a position where light incident on the liquid crystal element LD is converged by the first lens 5. The photosensor 22 outputs a signal according to the intensity of the received light. The sensor controller SCT measures the output from the photosensor 22.

An example illustrated in FIG. 7(*a*) shows the state in which the light L incident on the liquid crystal element LD in a direction substantially parallel to the normal N is converged by the first lens 5. The first lens 5 illustrated is a lens having a shape that is symmetrical with respect to the normal N of the liquid crystal element LD. An example illustrated in FIG. 7(*b*) shows the state in which the light L incident on the liquid crystal element LD in a direction substantially inclined with respect to the normal N at an angle of θ1 is converged by the first lens 5. The first lens 5 illustrated is a lens having a shape that is unsymmetrical with respect to the normal N of the liquid crystal element LD. The first lens 5 having such shapes is formed by controlling of the liquid crystal element LD by the liquid crystal controller LCT. Note that the light converged as illustrated in the drawing is mainly the first polarized light POL1, as has been explained with reference to FIG. 5.

The controller CT can determine an incident direction of the light L, on the basis of the shape of the first lens 5 formed by the control of the liquid crystal controller LCT, and the output from the photosensor 22 measured by the sensor controller SCT. An example of such control by the controller CT will be described below.

FIG. 8 is a flowchart for explaining an example of control of the photodetector PDT. Note that the memory unit M shown in FIG. 1 stores in advance a first voltage V1 for forming a first lens 5L of a first shape in the liquid crystal layer 53, a second voltage V2 for forming a first lens 5M of a second shape different from the first shape, and a third voltage V3 for forming a first lens 5R of a third shape different from the first shape and the second shape.

In the controller CT, the liquid crystal controller LCT applies, to the liquid crystal layer 53, the first voltage V1 read from the memory unit M at a predetermined timing based on control by the timing controller TCT (step ST11). The first lens 5L of the first shape is thereby formed in the liquid crystal layer 53. In one example, as shown in FIG. 9(*a*), in a state in which voltages of the first control electrodes E11 to E17 arranged in the first direction X are set such that they are gradually reduced relative to a voltage of the second control electrode E2, the first lens 5L that is unsymmetrical extending over the first control electrodes E11 to E17 is formed. The voltage applied to the first control electrodes E11 to E17 and the second control electrode E2 at this time corresponds to the first voltage V1 for forming the first lens 5L.

Further, the sensor controller SCT measures the output from the photosensor 22 in a state where the first lens 5L is formed (step ST12).

Next, the liquid crystal controller LCT applies, to the liquid crystal layer 53, the second voltage V2 read from the memory unit M at a predetermined timing based on the control by the timing controller TCT (step ST13). The first lens 5M of the second shape is thereby formed in the liquid crystal layer 53. In one example, as shown in FIG. 9(*b*), in a state in which the voltages of mainly the first control electrodes E11 and E17 are set to be the same, and the voltages of the first control electrodes E12 to E16 are each set to 0V or smaller than the voltage of the first control electrode E11, the first lens 5M that is symmetrical extending over the first control electrodes E11 to E17 is formed. The voltage applied to the first control electrodes E11 to E17 and the second control electrode E2 at this time corresponds to the second voltage V2 for forming the first lens 5M.

Further, the sensor controller SCT measures the output from the photosensor 22 in a state where the first lens 5M is formed (step ST14).

Next, the liquid crystal controller LCT applies, to the liquid crystal layer 53, the third voltage V3 read from the memory unit M at a predetermined timing based on the control by the timing controller TCT (step ST15). The first lens 5R of the third shape is thereby formed in the liquid crystal layer 53. In one example, as shown in FIG. 9(*c*), in a state in which the voltages of the first control electrodes E11 to E17 are set such that they are gradually increased relative to the voltage of the second control electrode E2, the first lens 5R that is unsymmetrical extending over the first control electrodes E11 to E17 is formed. The voltage applied to the first control electrodes E11 to E17 and the second control electrode E2 at this time corresponds to the third voltage V3 for forming the first lens 5R.

Further, the sensor controller SCT measures the output from the photosensor 22 in a state where the first lens 5R is formed (step ST16). After that, the sensor controller SCT compares the outputs measured at the respective timings, and determines a direction in which the maximum output can be obtained as being the incident direction of light (step ST17). For example, when the maximum output is obtained in a state where the first lens 5L of the first shape shown in FIG. 9(*a*) is formed, it can be determined that the incident direction of light is a direction inclined toward the left side of the drawing with respect to the normal N at an angle of θ11. Further, when the maximum output is obtained in a state where the first lens 5M of the second shape shown in FIG. 9(*b*) is formed, it can be determined that the incident direction of light is a direction along the normal N. Furthermore, when the maximum output is obtained in a state where the first lens 5R of the third shape shown in FIG. 9(*c*) is formed, it can be determined that the incident direction of light is a direction inclined toward the right side of the drawing with respect to the normal N at an angle of θ12.

Note that the first lens 5 may be shaped in a variety of forms other than the three shapes illustrated in FIG. 9, and the output from the photosensor 22 can be measured every time a new shape is formed. Further, the shape of the first lens 5 can be made to change continuously from the first lens 5L of the first shape shown in FIG. 9 to the first lens 5R of the third shape through the first lens 5M of the second shape, and an angle of incidence of the light can be measured by measuring the output from the photosensor 22 every time the shape of the first lens 5L is changed.

According to the present embodiment, the liquid crystal element LD capable of forming the first lens 5 having the function of converging the incident light at a position opposed to the photosensor 22 is provided. Since the first lens 5 is formed by the liquid crystal layer 53, by controlling the alignment state of the liquid crystal molecules, the shape of the first lens 5 can be changed. In a photodetector structured by combining an optical lens formed by glass, resin, or the like, and the photosensor, a movement mechanism for changing the angle or orientation of the photosensor, etc., is required. However, since the photodetector PDT of the present embodiment can change the shape of the first lens 5, the incident direction of light can be determined without changing the angle or orientation of the first lens 5 and the photosensor 22. Accordingly, according to the present embodiment, as compared to a movable photodetector, a photodetector PDT which is small in size and low in cost can be provided.

Next, another configuration example of the photodetector PDT will be explained.

Figure 10:
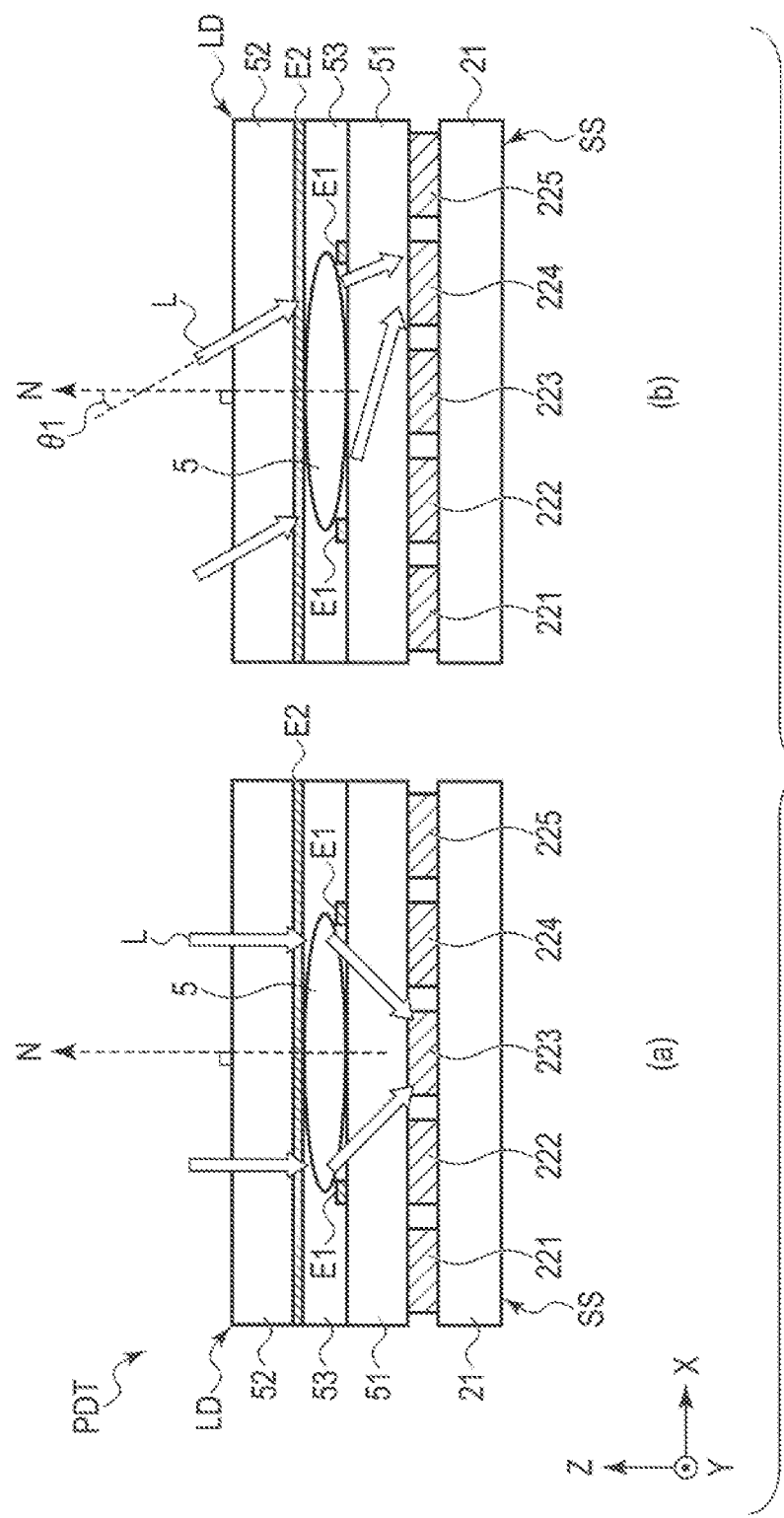
FIG. 10 is an illustration showing another configuration example of the photodetector PDT of the present embodiment.

FIG. 10 is an illustration showing another configuration example of the photodetector PDT of the present embodiment. The configuration example illustrated in FIG. 10 is different from the configuration example illustrated in FIG. 7 in that the sensor unit SS comprises a plurality of photosensors 221 to 225 on the substrate 21. In the example illustrated, the photosensors 221 to 225 are arranged in the first direction X. Each of the photosensors 221 to 225 outputs a signal according to the intensity of the received light. Note that the number of photosensors 22 provided in the sensor unit SS is not limited to that of the illustrated example.

The first lens 5 formed in the liquid crystal layer 53 is opposed to the photosensors 221 to 225. In the present configuration example, the shape of the first lens 5 does not change. That is, a voltage applied to the liquid crystal layer 53 is constant, and for example, the second voltage V2 for forming the first lens 5M described above is applied to the first control electrode E1 and the second control electrode E2.

An example illustrated in FIG. 10(a) shows the state in which the light L incident on the liquid crystal element LD in a direction substantially parallel to the normal N is converged by the first lens 5. The light L incident from outside in a normal direction is converged on the photosensor 223 by the first lens 5. In this case, of the plurality of photosensors, the photosensor 223 gives the maximum output. An example illustrated in FIG. 10(b) shows the state in which the light L incident on the liquid crystal element LD in a direction substantially inclined with respect to the normal N at the angle of θ1 is converged by the first lens 5. The light L being incident obliquely is converged to the photosensor 224 by the first lens 5. In this case, of the plurality of photosensors, the photosensor 224 gives the maximum output.

As can be seen, even in a structure in which the shape of the first lens 5 does not change, by comparing the outputs from the plurality of photosensors 22 arranged directly under the first lens 5, the incident direction of the light L can be determined. Further, since the shape of the first lens 5 does not need to be changed, control for forming the first lens 5 can be simplified. Note that the first lens 5 capable of changing its shape likewise the configuration example of FIG. 7 and the configuration example of FIG. 10 comprising the plurality of photosensors 22 may be combined.

A combination of a single first lens 5 and multiple photosensors 22 can be changed variously.

In an example illustrated in FIG. 11, the first lens 5 is a convex lens which includes a curved surface having a generatrix along the second direction Y, and projects in the third direction Z. The photosensors 22 are arranged in the first direction X. With the first lens 5 illustrated, a convergence position is shifted in the first direction X in accordance with the incident direction of the light. Accordingly, by comparing the outputs from the photosensors 22 arranged in the first direction X, the incident direction of the light L in an X-Z plane defined by the first direction X and the third direction Z can be determined.

In an example illustrated in FIG. 12, the first lens 5 is a convex lens which is substantially circular in the X-Y plane defined by the first direction X and the second direction Y, and projects in the third direction Z. The photosensors 22 are arranged in a matrix in the first direction X and the second direction Y. With the first lens 5 illustrated, a convergence position is shifted in the first direction X and the second direction Y in accordance with the incident direction of the light. Accordingly, by comparing the outputs from the photosensors 22 arranged in a matrix, an incident azimuth of the light L with the third direction Z assumed as the center can be determined.

Figure 13:
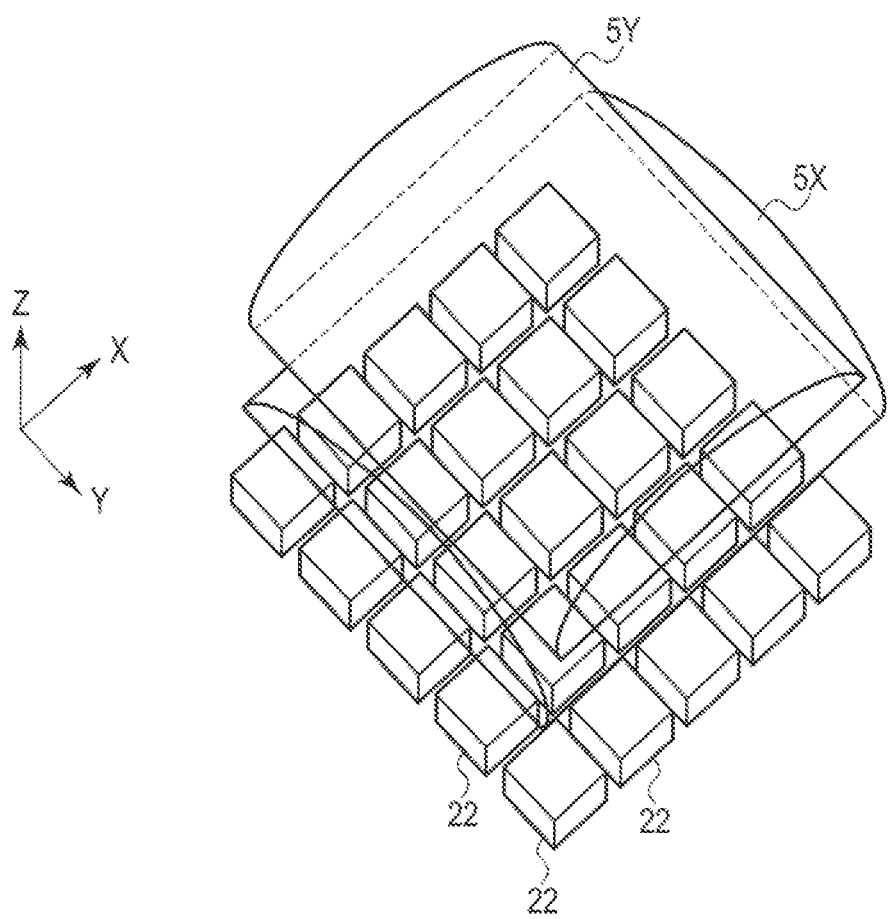
FIG. 13 is an illustration showing yet another configuration example of the photodetector PDT of the present embodiment.

In an example illustrated in FIG. 13, a first lens 5X is a convex lens which includes a curved surface having a generatrix along the first direction X, and projects in the third direction Z. A first lens 5Y is a convex lens which includes a curved surface having a generatrix along the second direction Y, and projects in the third direction Z. The first lenses 5X and 5Y are arranged in the third direction Z. The photosensors 22 are arranged in a matrix in the first direction X and the second direction Y. Also in this example, likewise the example illustrated in FIG. 12, the incident azimuth of the light L with the third direction Z assumed as the center can be determined.

Next, an example of application of the photodetector PDT of the present embodiment will be described.

Figure 14:
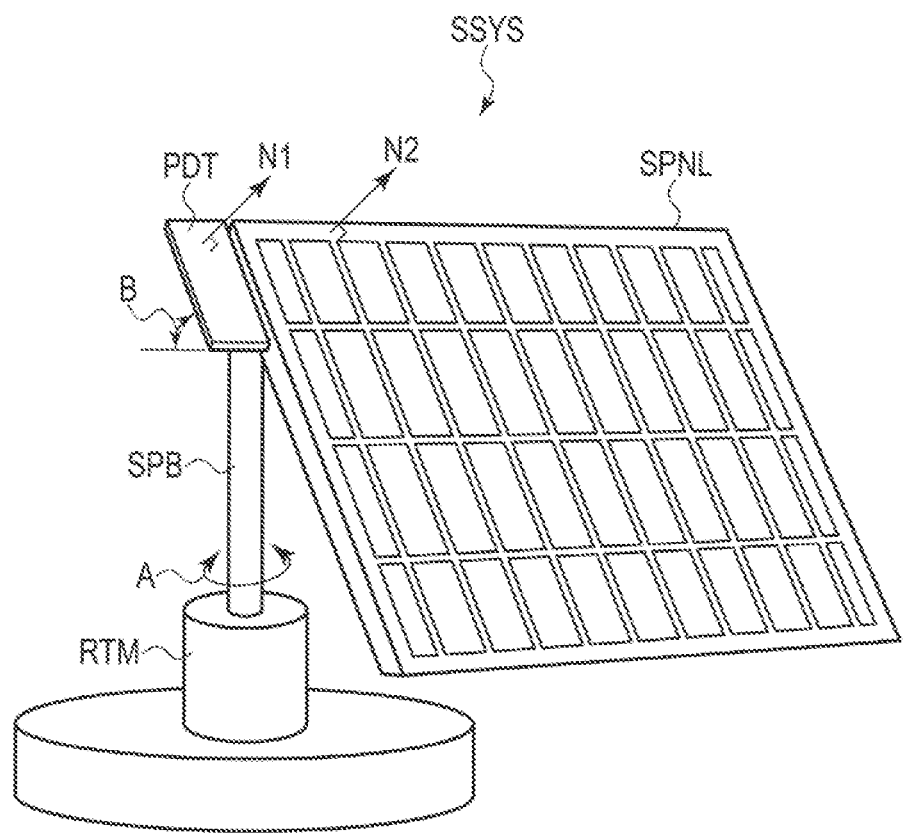
FIG. 14 is an illustration showing a configuration example of a solar system SSYS, which is an example of application of the photodetector PDT.

FIG. 14 is an illustration showing a configuration example of a solar system SSYS, which is an example of application of the photodetector PDT. The solar system SSYS comprises a solar panel SPNL, the photodetector PDT, a support body SPB, and a rotation mechanism RTM. The solar panel SPNL performs heating, cooling, electric power generation, etc., by using solar energy. The structure of the photodetector PDT is as described above. The support body SPB supports the solar panel SPNL and the photodetector PDT. The rotation mechanism RTM rotates the support body SPB. Not only is the rotation mechanism RTM rotated in a horizontal plane as shown by arrow A in the drawing, but is also driven in a direction of an elevation angle with respect to the horizontal plane as shown by arrow B in the drawing. The photodetector PDT may be incorporated in the solar panel SPNL. Note that normal N1 of the photodetector PDT should preferably be parallel to normal N2 of the solar panel SPNL.

Figure 15:
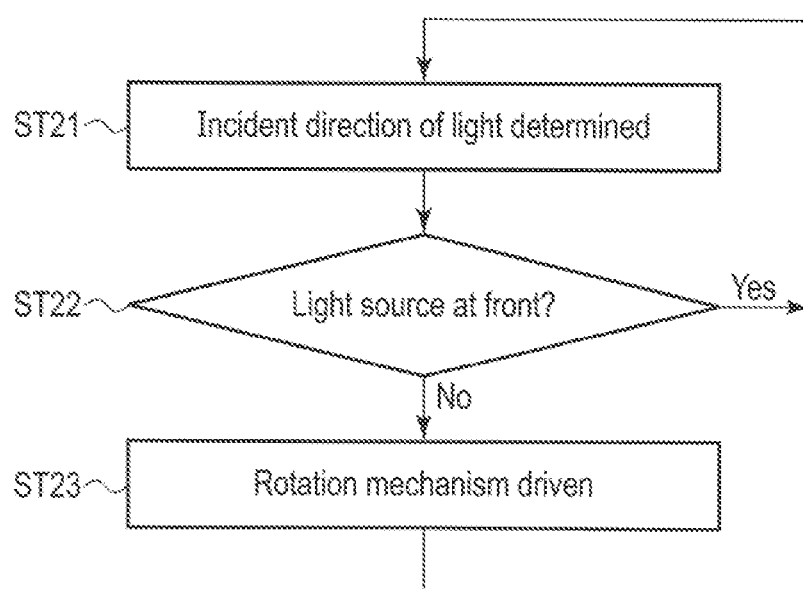
FIG. 15 is a flowchart for explaining an example of control of the solar system SSYS shown in FIG. 14.

FIG. 15 is a flowchart for explaining an example of control of the solar system SSYS shown in FIG. 14.

First, the photodetector PDT determines the incident direction of light by the configuration example explained with reference to FIGS. 7 to 9, or the configuration example explained with reference to FIGS. 10 to 13 (step ST21). Further, the photodetector PDT determines whether a light source, that is, the sun is positioned in front of the solar panel SPNL, on the basis of the light incident direction which has been determined (step ST22). More specifically, the photodetector PDT determines whether the light source is positioned at the front by determining whether the light incident direction which has been determined is parallel to normal N1 of the photodetector PDT. When it is determined that the light source is positioned at the front (in other words, the determined incident direction is parallel to normal N1) (Yes in step ST22), the flow returns to step ST21 again. Meanwhile, when it is determined that the light source is not positioned at the front (in other words, the determined incident direction is not parallel to normal N1) (No in step ST22), the rotation mechanism RTM is driven (step ST23). The rotation mechanism RTM rotates the support body SPB such that normal N2 of the solar panel SPNL faces the light source.

By this control, it is possible to direct the solar panel SPNL toward the light source so as to follow the light source whose position changes, and the efficiency of use of the solar energy can be improved.

Next, yet another configuration example of the photodetector PDT will be explained.

FIG. 16 is an illustration showing yet another configuration example of the photodetector PDT of the present embodiment. A configuration example shown in FIG. 16 is different from the configuration example illustrated in FIG. 7 in that a modulation element MD which modulates the incident light is provided. The modulation element MD comprises a modulation portion MA which imparts a retardation to the incident light, and a non-modulation portion NMA which transmits the incident light practically without modulating the same. The modulation portion MA imparts, for example, a retardation of approximately $\lambda/2$ to the incident light. $\lambda$ indicates a wavelength of the incident light. When the incident light is linearly polarized light, the modulation portion MA as described above has the function of rotating a polarization plane of the linearly polarized light by approximately 90 degrees. The modulation element MD may be constituted by a liquid crystal element which can partially control the retardation, or may be constituted by a retardation film partially having retardation. The modulation portion MA is smaller than the non-modulation portion NMA. In one example, a width W1 of the modulation portion MA along the first direction X is smaller than a width W2 of the non-modulation portion NMA along the first direction X. Although a detailed configuration example of the modulation element MD will be described later, in the example illustrated, the modulation element MD comprises a third substrate 61 and a fourth substrate 62. The modulation portion MA and the non-modulation portion NMA are both located between the third substrate 61 and the fourth substrate 62. When the modulation element MD is constituted by a liquid crystal element which will be described later, the modulation element MD is controlled by a modulation controller MCT.

In the example illustrated, the sensor unit SS is incorporated in the modulation element MD. That is, the photosensor 22 is located between the third substrate 61 and the fourth substrate 62. The third substrate 61 corresponds to a substrate on which the photosensor 22 is mounted. The sensor unit SS is controlled by the sensor controller SCT.

The liquid crystal element LD comprises a third control electrode E3 and a fourth control electrode E4 for forming a second lens 6 in the liquid crystal layer 53, in addition to the first control electrode E1 and the second control electrode E2 for forming the first lens 5 in the liquid crystal layer 53. Such a liquid crystal element LD is controlled by the liquid crystal controller LCT.

In one example, the third control electrode E3 is provided on the first substrate 51 likewise the first control electrode E1, and can be formed of the same material as that of the first control electrode E1. The fourth control electrode E4 is provided on the second substrate 52 likewise the second control electrode E2, and can be formed of the same material as that of the second control electrode E2. Also, the second control electrode E2 and the fourth control electrode E4 may be formed integrally. Each of the third control electrode E3 and the fourth control electrode E4 is formed of a transparent conductive material such as ITO or IZO. The third control electrode E3 is a strip electrode extending in the second direction Y likewise the first control electrode E1 shown in FIG. 3. The fourth control electrode E4 is a rectangular plate electrode likewise the second control electrode E2 shown in FIG. 3. The third control electrode E3 and the fourth control electrode E4 apply a voltage for forming the second lens 6 in the liquid crystal layer 53. The second lens 6 formed in the liquid crystal layer 53 is opposed to the modulation element MD. In the modulation element MD, the modulation portion MA is arranged at a position where the light is converged by the second lens 6. The width W1 of the modulation portion MA is less than a width W3 of the second lens 6 along the first direction X (in other words, an interval between the third control electrodes E3 for forming the second lens 6). Note that an arrow represented by a solid line in the drawing denotes the first polarized light POL1 having an oscillation plane along the first direction X, and an arrow represented by a dotted line in the drawing denotes the second polarized light POL2 having an oscillation plane along the second direction Y. Also, similarly to the first lens 5 explained with reference to FIG. 9, the shape of the second lens 6 can be changed freely by controlling a voltage to be applied to the third control electrode E3 and the fourth control electrode E4.

FIG. 17 is an illustration for explaining the function of the liquid crystal element LD and the modulation element MD shown in FIG. 16. Of the light incident on the liquid crystal element LD, the first polarized light POL1 is converged by the second lens 6 and enters the modulation element MD, as shown on the left side of the drawing. Almost all of the first polarized light POL1 enters the modulation portion MA, and is converted into the second polarized light POL2. That is, the first polarized light POL1 which has entered the liquid crystal element LD is converted into the second polarized light POL2, and passes through the modulation element MD.

Meanwhile, of the light incident on the liquid crystal element LD, the second polarized light POL2 enters the modulation element MD practically without being converged by the second lens 6, as shown on the right side of the drawing. The second polarized light POL2 enters the modulation portion MA and the non-modulation portion NMA. As stated above, since the non-modulation portion NMA is greater than the modulation portion MA, light incident on the non-modulation portion NMA of the light incident on the modulation element MD is more than light incident on the modulation portion MA. In other words, most of the second polarized light POL2 incident on the modulation element MD is transmitted with its polarization plane unchanged because it passes through the non-modulation portion NMA which does not modulate the light. Part of the second polarized light POL2, which is incident on the modulation element MD, enters the modulation portion MA, and is converted into the first polarized light POL1. As described above, the second polarized light POL2 made incident on the liquid crystal element LD passes through the modulation element MD by mostly being maintained as the second polarized light POL2.

According to such a configuration example, regardless of a direction of polarization of light incident on the liquid crystal element LD, the polarization directions of light beams which have passed through the modulation element MD can be made substantially uniform. Light beams whose polarization directions are uniform are suitable as the illumination light of a liquid crystal display device, for example.

FIG. 18 is a cross-sectional view showing a configuration example of the modulation element MD. Here, a case where the modulation element MD is constituted by a liquid crystal element will be described. Such a modulation element MD is controlled by the modulation controller MCT.

The modulation element MD comprises the third substrate 61, the fourth substrate 62, a liquid crystal layer 63, a fifth control electrode E6, and a sixth control electrode E6. In the example illustrated, the fifth control electrode E5 is provided on the third substrate 61, and the sixth control electrode E6 is provided on the fourth substrate 62. However, the fifth control electrode E5 and the sixth control electrode E6 may both be provided on the same substrate, that is, on the third substrate 61 or the fourth substrate 62.

The third substrate 61 comprises a transparent insulating substrate 611, the fifth control electrode E5, an alignment film 612, and a feeder 613. The fifth control electrode E5 is located between the insulating substrate 611 and the liquid crystal layer 63. A plurality of fifth control electrodes E5 are arranged at intervals in the first direction X in an effective area 60A. In one example, a width of each of the fifth control electrodes E5 along the first direction X is greater than an interval between adjacent fifth control electrodes E5 along the first direction X. The alignment film 612 covers the fifth control electrodes E5, and is in contact with the liquid crystal layer 63. The feeder 613 is located in a non-effective area 60B outside the effective area 60A.

The fourth substrate 62 comprises a transparent insulating substrate 621, the sixth control electrode E6, and an alignment film 622. The sixth control electrode E6 is located between the insulating substrate 621 and the liquid crystal layer 63. The sixth control electrode E6 is, for example, a single plate electrode which is located on substantially the entire surface of the effective area 60A, and also extends to the non-effective area 60B. In the effective area 60A, the sixth control electrode E6 is opposed to the fifth control electrode E5 via the liquid crystal layer 63. The sixth control electrode E6 is opposed to the feeder 613 in the non-effective area 60B. The alignment film 622 covers the sixth control electrode E6, and is in contact with the liquid crystal layer 63.

Each of the insulating substrates 611 and 621 is, for example, a glass substrate or a resin substrate. Each of the fifth control electrode E5 and the sixth control electrode E6 is formed of a transparent conductive material such as ITO or IZO. The fifth control electrode E5 is a strip electrode extending in the second direction Y likewise the first control electrode E1 shown in FIG. 3. The sixth control electrode E6 is a rectangular plate electrode likewise the second control electrode E2 shown in FIG. 3. Each of the alignment films 612 and 622 is, for example, a horizontal alignment film. In one example, the alignment film 612 is subjected to alignment treatment along the second direction Y, and the alignment film 622 is subjected to alignment treatment along the first direction X.

The third substrate 61 and the fourth substrate 62 are bonded to each other by a sealant 64 in the non-effective area 60B. The sealant 64 includes a conductive material 65. The conductive material 65 is interposed between the feeder 613 and the sixth control electrode E6, and electrically connects the feeder 613 and the sixth control electrode E6.

The liquid crystal layer 63 is held between the third substrate 61 and the fourth substrate 62. The liquid crystal layer 63 is formed of, for example, a liquid crystal material having positive dielectric anisotropy. The fifth control electrode E5 and the sixth control electrode E6 apply a voltage for forming the modulation portion MA and the non-modulation portion NMA shown in FIG. 17 to the liquid crystal layer 63.

The modulation controller MCT controls the voltage to be applied to the liquid crystal layer 63. By controlling the voltage applied to each of the fifth control electrode E5 and the sixth control electrode E6, the modulation controller MCT can form the modulation portion MA and the non-modulation portion NMA in the liquid crystal layer 63. Further, by controlling the voltage applied to each of the fifth control electrodes E5, the modulation controller MCT can control the positions where the modulation portion MA and the non-modulation portion NMA are formed. Furthermore, by controlling the voltage applied to each of the fifth control electrodes E5, the modulation controller MCT can control the size of the modulation portion MA and the non-modulation portion NMA freely.

Figure 19:
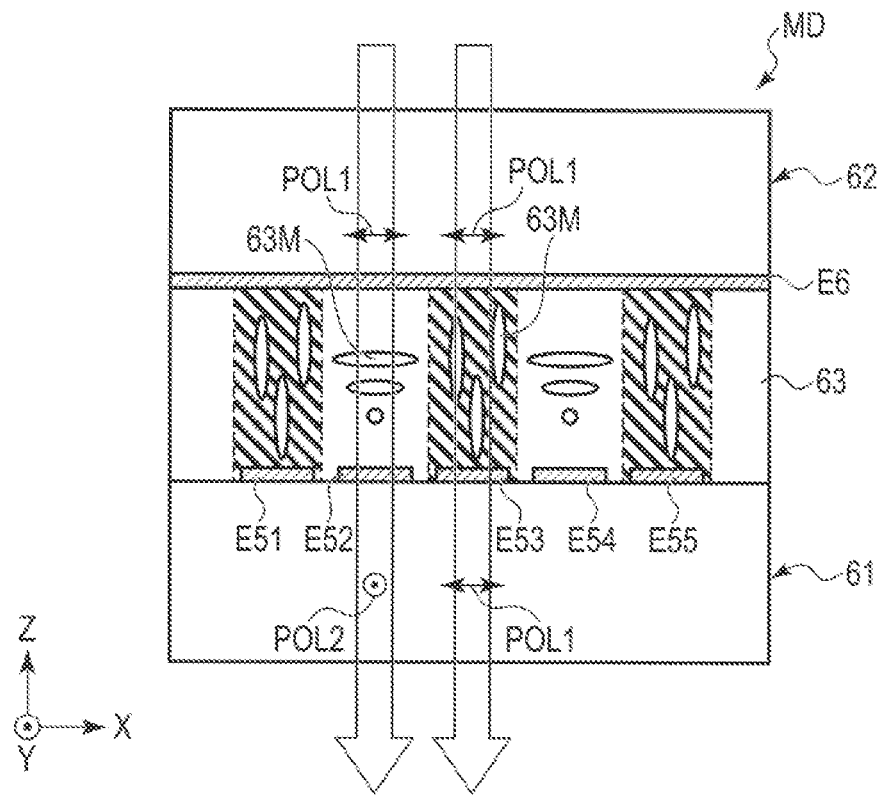
FIG. 19 is an illustration for explaining a modulation portion MA and a non-modulation portion NMA formed in the modulation element MD.

FIG. 19 is an illustration for explaining the modulation portion MA and the non-modulation portion NMA formed in the modulation element MD. FIG. 19 illustrates only the structures necessary for explanation. Here, a case of applying a voltage, which is different from that applied to the sixth control electrode E6, to fifth control electrodes E51, E53, and E55, of a plurality of fifth control electrodes E51 to E55 arranged in the first direction X, will be described.

In one example, the voltage of the fifth control electrodes E51, E53, and E55 is 6V, and the voltage of the fifth control electrodes E52 and E54, and the sixth control electrode E6 is 0V. Further, the liquid crystal layer 63 has the positive dielectric anisotropy as stated above. Liquid crystal molecules 63M included in the liquid crystal layer 63 are twisted-aligned by 90 degrees in a state where no electric field is formed. In other words, the liquid crystal molecules 63M near the fifth control electrodes E51 to E53 are initially aligned such that their major axes are aligned in the second direction Y, and the liquid crystal molecules 63M near the sixth control electrode E6 are initially aligned such that their major axes are aligned in the first direction X. Further, the liquid crystal molecules 63M are aligned such that their major axes are aligned along an electric field in a state where the electric field is formed.

In each of regions in which the fifth control electrodes E51, E53, and E55 are opposed to the sixth control electrode E6, an electric field along the third direction Z is formed. Therefore, the liquid crystal molecules 63M are vertically aligned such that their major axes are aligned along the third direction Z. In each of regions in which the fifth control electrodes E52 and E54 are opposed to the sixth control electrode E6, an electric field is not formed. Therefore, the liquid crystal molecules 63M are maintained in the initial alignment state, and twisted-aligned.

Here, a case where the first polarized light POL1 enters the modulation element MD is assumed. Of beams of the first polarized light POL1 which enter from the fourth substrate 62, a beam of the first polarized light POL1, which enters a region in which the fifth control electrode E52 and the sixth control electrode E6 are opposed to each other, is affected by the twisted-aligned liquid crystal molecules 63M, and the polarization plane is rotated. Thus, after the above first polarized light POL1 passes through the liquid crystal layer 63, it is converted into the second polarized light POL2 having an oscillation plane along the second direction Y. Similarly in the region in which the fifth control electrode E54 is opposed to the sixth control electrode E6, the transmitted light is converted into the second polarized light POL2. Meanwhile, the first polarized light POL1 incident on a region in which the fifth control electrode E53 and the sixth control electrode E6 are opposed to each other is hardly affected by the liquid crystal molecules 63M that are vertically aligned. Thus, the above first polarized light POL1 passes through the liquid crystal layer 63 while maintaining its polarization plane. Similarly in the regions in which the fifth control electrodes E51 and E55 are opposed to the sixth control electrode E6, the transmitted light is the first polarized light POL1.

In other words, regions in which the fifth control electrodes E51, E53, and E55 are opposed to the sixth control electrode E6 correspond to the non-modulation portions NMA shown in FIG. 17, and regions in which the fifth control electrodes E52 and E54 are opposed to the sixth control electrode E6 correspond to the modulation portions MA shown in FIG. 17.

In the present embodiment, as an example of the modulation element MD, a system obtained by combining the liquid crystal layer 63 including liquid crystal molecules twisted-aligned in the initial alignment state and an electric field produced along a direction intersecting the substrate main surface has been explained. However, the modulation element MD is not limited to the above. That is, as long as the system can form a region which modulates the incident light in accordance with a voltage applied to the liquid crystal layer 63, and a region which transmits the incident light without modulating the same, such a system is applicable to the modulation element MD described above.

Figure 20:
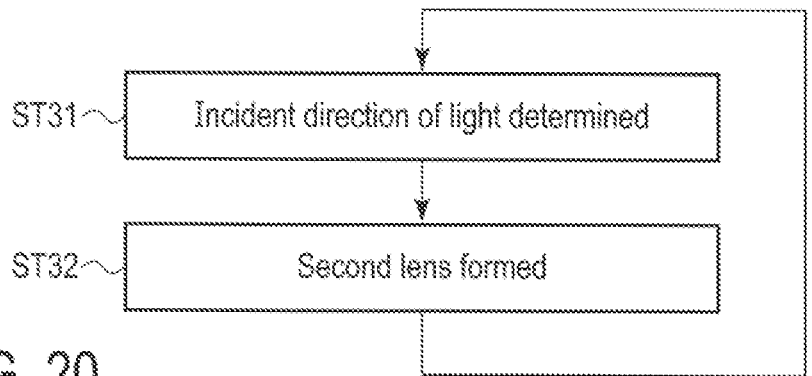
FIG. 20 is an illustration for explaining an example of control of the photodetector PDT comprising the modulation element MD shown in FIGS. 16 and 18.

FIG. 20 is an illustration for explaining an example of control of the photodetector PDT comprising the modulation element MD shown in FIGS. 16 and 18.

First, the controller CT determines the incident direction of light, on the basis of the output from the photosensor 22, as in the configuration example explained with reference to FIGS. 7 to 9, or the configuration example explained with reference to FIGS. 10 to 13 (step ST31). Further, the controller CT controls the liquid crystal element LD, and forms the second lens 6 such that the light entering in the incident direction which has been determined converges to the modulation portion MA (step ST32). In the second lens 6 formed in a specific shape, the convergence position is shifted in accordance with the incident direction of the light. In the control example explained in this specification, the shape of the second lens 6 is changed so as to fix the convergence position regardless of the incident direction of the light. In other words, the controller CT controls the voltage applied to the third control electrode E3 and the fourth control electrode E4 in order to form the second lens 6 of a desired shape whereby the modulation portion MA matches with the convergence position.

By this control, even if the position of the modulation portion MA is fixed, the polarization directions of light beams which have passed through the modulation element MD can be made substantially uniform regardless of the incident direction of the light.

Figure 21:
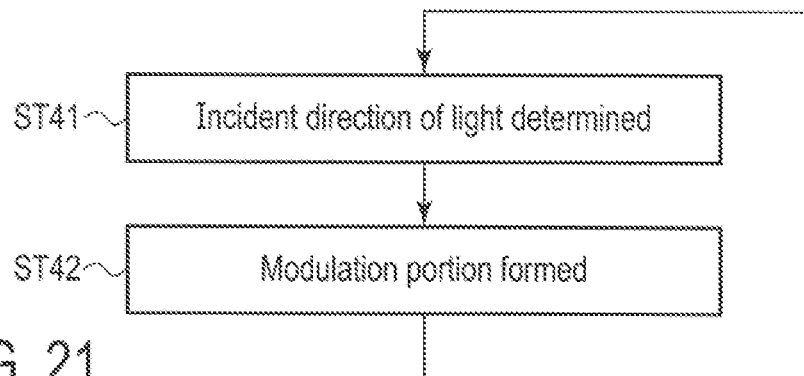
FIG. 21 is an illustration for explaining another example of control of the photodetector PDT comprising the modulation element MD shown in FIGS. 16 and 18.

FIG. 21 is an illustration for explaining another example of control of the photodetector PDT comprising the modulation element MD shown in FIGS. 16 and 18.

First, the controller CT determines the incident direction of light, on the basis of the output from the photosensor 22, as in the configuration example explained with reference to FIGS. 7 to 9, or the configuration example explained with reference to FIGS. 10 to 13 (step ST41). Further, the controller CT controls the modulation element MD, and forms the modulation portion MA at a place where the light entering in the determined incident direction is converged by the second lens 6 (step ST42). In the control example explained in this specification, the position of the modulation portion MA is changed so that the modulation portion MA follows the convergence position which is shifted in accordance with the incident direction of light, in a case where the shape of the second lens 6 is not varied. In other words, the controller CT controls the voltage applied to the fifth control electrode E5 and the sixth control electrode E6 so as to form the modulation portion MA at the convergence position of the incident light.

By such control, even if the shape of the second lens 6 is fixed, the polarization directions of light beams which have passed through the modulation element MD can be made substantially uniform regardless of the incident direction of the light.

FIG. 22 is an illustration showing another configuration example of the photodetector PDT of the present embodiment. The configuration example illustrated in FIG. 22 is different from the configuration example illustrated in FIG. 16 in that this configuration example includes an opening OP, in stead of the first lens 5, at a position opposed to the photosensor 22. The liquid crystal element LD comprises a light-shielding body BM at a position different from where the second lens 6 is formed. In the light-shielding body BM, the opening OP is formed. In one example, the opening OP is a pinhole, and has a diameter of approximately 50 to 100 μm. Alternatively, the opening OP may be a slit extending in the second direction Y. The photosensor 22 is located between the opening OP and the third substrate 61.

Also in this configuration example, the same advantage as that of the above-described configuration example can be obtained.

Next, an example of a display device DSP will be explained.

Figure 23:
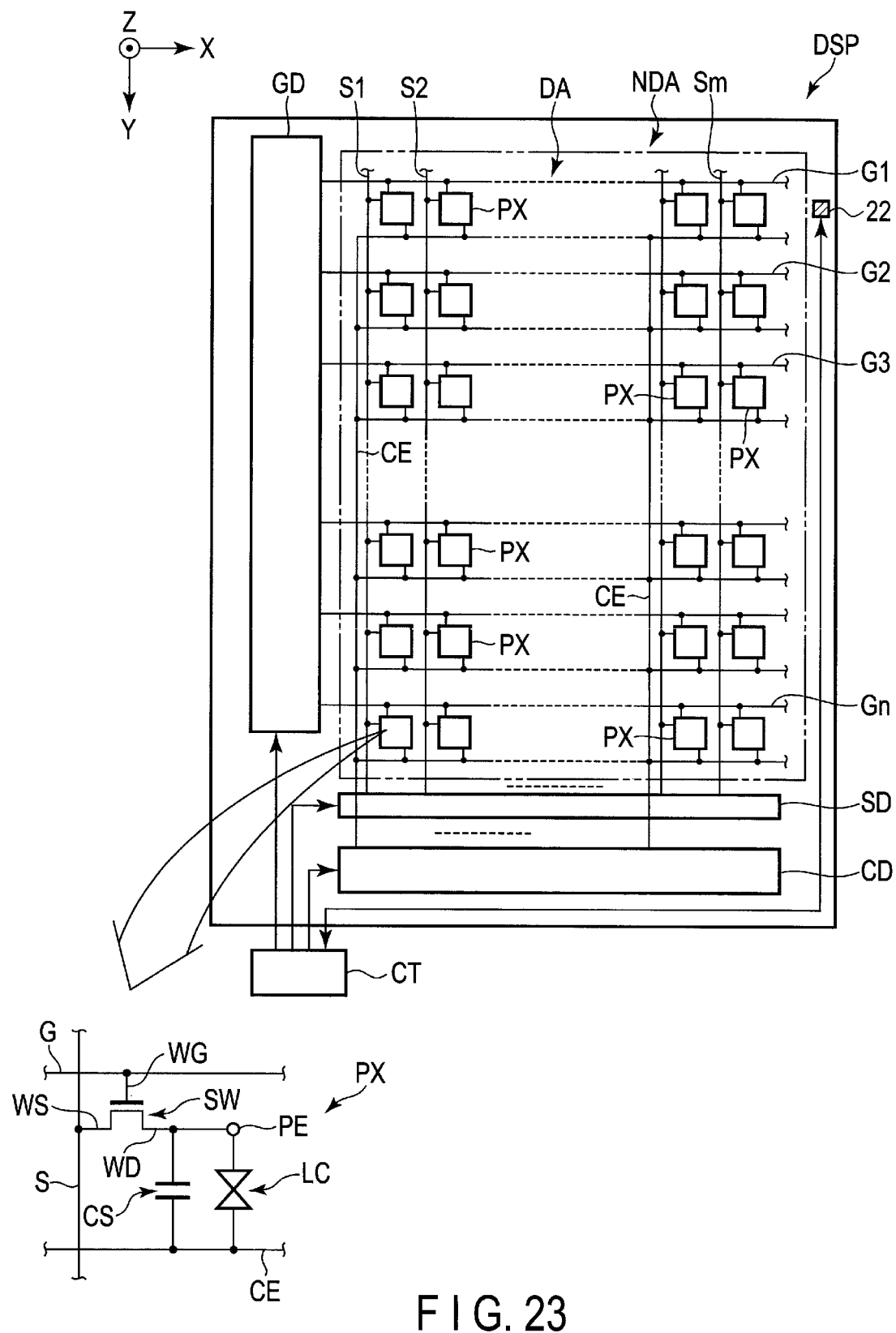
FIG. 23 is an illustration showing the basic structure and an equivalent circuit of a display device DSP.

FIG. 23 is an illustration showing the basic structure and an equivalent circuit of the display device DSP.

The display device DSP includes a display area DA in which an image is displayed, and a non-display area NDA which surrounds the display area DA. The display area DA comprises a plurality of pixels PX. Here, the pixel indicates a minimum unit which can be individually controlled in accordance with a pixel signal, and exists in, for example, an area including a switching element arranged at a position where a scanning line and a signal line, which will be described later, cross each other. The pixels PX are arrayed in a matrix in the first direction X and the second direction Y. Also, the display device DSP includes scanning lines (also referred to as gate lines) G (G1 to Gn), signal lines (also referred to as data lines or source lines) S (S1 to Sm), a common electrode CE, etc., in the display area DA. The scanning lines G extend in the first direction X, and are arranged in the second direction Y. The signal lines S extend in the second direction Y, and are arranged in the first direction X. Note that the scanning lines G and the signal lines S do not necessarily extend linearly, but may be partially bent. The common electrode CE is disposed over the pixels PX. The scanning lines G are connected to a scanning line drive circuit GD, the signal lines S are connected to a signal line drive circuit SD, and the common electrode CE is connected to a common electrode drive circuit CD. The scanning line drive circuit GD, the signal line drive circuit SD, and the common electrode drive circuit CD are controlled by the controller CT.

Each of the pixels PX comprises a switching element SW, a pixel electrode PE, the common electrode CE, a liquid crystal layer LC, and the like. The switching element SW is constituted by a thin-film transistor (TFT), for example, and is electrically connected to the scanning line G and the signal line S. More specifically, the switching element SW includes a gate electrode WG, a source electrode WS, and a drain electrode WD. The gate electrode WG is electrically connected to the scanning ling G. In the example illustrated, the electrode electrically connected to the signal line S is referred to as the source electrode WS, and the electrode electrically connected to the pixel electrode PE is referred to as the drain electrode WD. The scanning line G is connected to the switching elements SW of the respective pixels PX arranged in the first direction X. The signal line S is connected to the switching elements SW of the respective pixels PX arranged in the second direction Y.

The pixel electrode PE is electrically connected to the switching element SW. The common electrode CE is opposed to a plurality of pixel electrodes PE. The pixel electrode PE and the common electrode CE function as a first display electrode and a second display electrode which apply a voltage to a liquid crystal layer 13. The pixel electrode PE and the common electrode CE are formed of a transparent conductive material such as ITO or IZO. A storage capacitance CS is formed between, for example, the common electrode CE and the pixel electrode PE.

Although the details of the structure of the display device DSP will not be described here, the display device DSP has a structure corresponding to one of various modes including a twisted nematic (TN) mode, a polymer dispersed liquid crystal (PDLC) mode, an optically compensated bend (OCB) mode, an electrically controlled birefringence (ECB) mode, a vertically aligned (VA) mode, a fringe field switching (FFS) mode, and in-plane switching (IPS) mode. Also, while explanation has been provided for a case where each of the pixels PX is driven by an active method, the pixels PX may be driven by a passive method.

The photosensor 22 is incorporated in the display device DSP. In the example illustrated, the photosensor 22 is arranged in the non-display area NDA. The photosensor 22 is controlled by the controller CT.

FIG. 24 is a plan view showing a configuration example of the display device DSP shown in FIG. 23. The display device DSP includes a first substrate SUB1 and a second substrate SUB2. The first substrate SUB1 and the second substrate SUB2 are bonded to each other by a sealant SE. The sealant SE is located in the non-display area NDA. In the non-display area NDA, a portion including downward-sloping hatch lines corresponds to a region where the light-shielding body BM is located, and a portion including crossed lines corresponds to a region where the light-shielding body BM and the sealant SE overlap one another.

When a part of the non-display area NDA is increased, the photosensor 22 overlaps the opening OP formed in the light-shielding body BM. In the example illustrated in FIG. 24(a), the opening OP is a circular pinhole. In the example illustrated in FIG. 24(b), the opening OP is formed in a slit shape extending in the second direction Y. In either of the examples, the photosensor 22 and the opening OP are located closer to the display area DA than the sealant SE.

Figure 25:
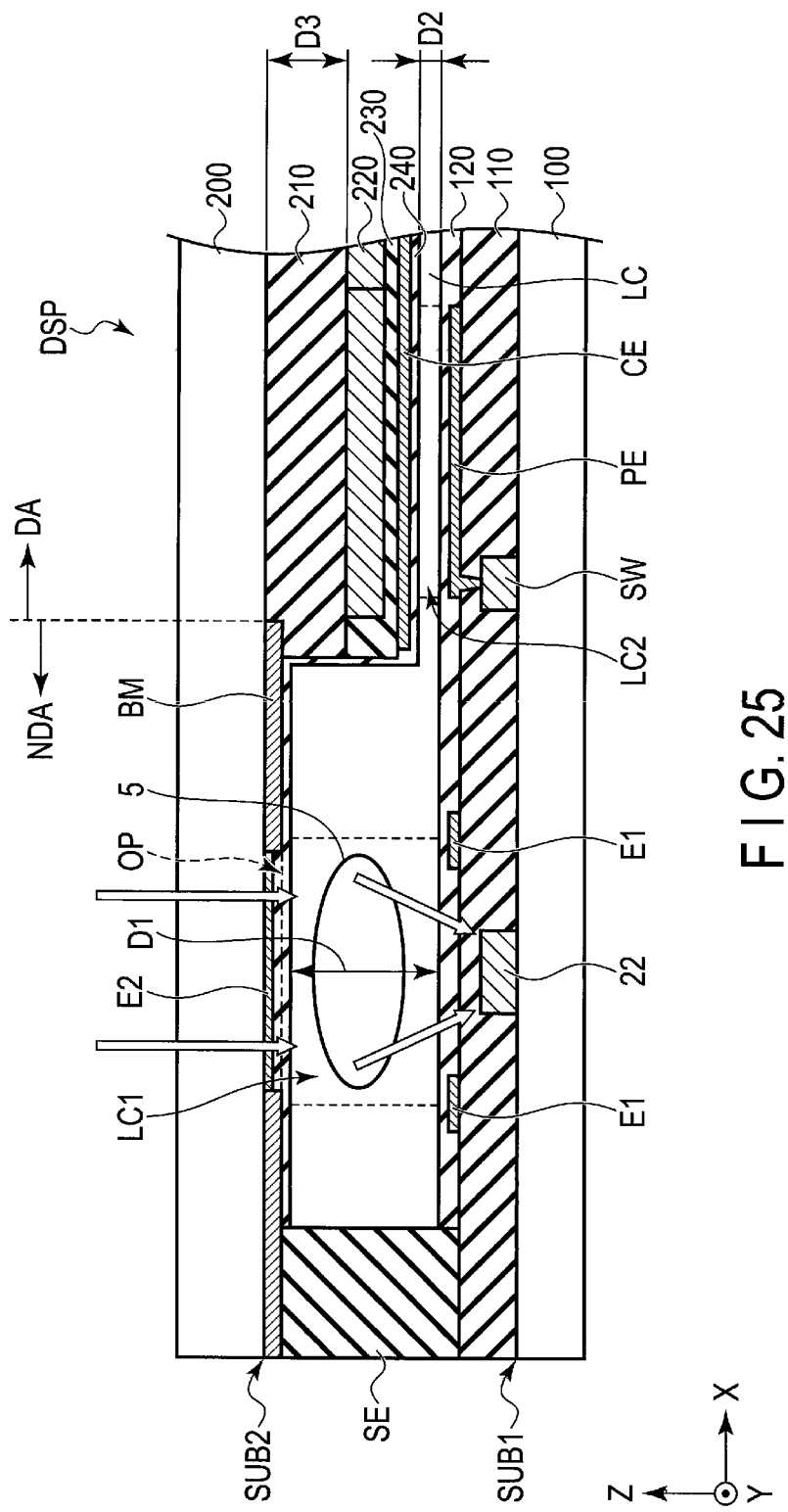
FIG. 25 is a cross-sectional view showing a configuration example of the display device DSP shown in FIG. 23.

FIG. 25 is a cross-sectional view showing a configuration example of the display device DSP shown in FIG. 23.

The first substrate 1 comprises an insulating substrate 100, an insulating film 110, an alignment film 120, the switching element SW, the pixel electrode PE, the photosensor 22, the first control electrode E1, etc. The insulating substrate 100 and the insulating film 110 are both transparent. In the display area DA, the switching element SW is arranged between the insulating substrate 100 and the insulating film 110. The pixel electrode PE is arranged between the insulating film 110 and the alignment film 120, and is electrically connected to switching element SW.

In the non-display area NDA, the photosensor 22 is arranged between the insulating substrate 100 and the insulating film 110. The photosensor 22 is, for example, a PIN photodiode, and can be formed in the process of forming the switching element SW. The first control electrode E1 is arranged between the insulating film 110 and the alignment film 120. The first control electrode E1 is located closer to the liquid crystal layer LC than the photosensor 22. A space between the illustrated two first control electrodes E1 overlaps the photosensor 22. In the example illustrated, the pixel electrode PE and the first control electrode E1 are located in the same layer, and can be formed of the same material. In one example, the pixel electrode PE is a reflective electrode, and is formed of a reflective metal material such as aluminum or silver. Note that the pixel electrode PE may be a transparent electrode formed of ITO, etc. The pixel electrode PE and the first control electrode E1 are located on the insulating film 110, and are covered with the alignment film 120.

The second substrate SUB2 comprises an insulating substrate 200, an insulating layer 210, a color filter 220, an overcoat layer 230, an alignment film 240, the common electrode CE, the second control electrode E2, the light-shielding body BM, etc. The insulating substrate 200 and the insulating layer 210 are both transparent. The insulating layer 210 is disposed over substantially the entire area of the display area DA, but is not arranged in an area where the first lens 5 is formed in the non-display area NDA. The insulating layer 210 is a transparent insulating layer, and is formed of a transparent organic material. The color filter 220 is arranged between the insulating layer 210 and the overcoat layer 230. The overcoat layer 230 covers the color filter 220. The common electrode CE is disposed between the overcoat layer 230 and the alignment film 240. The common electrode CE is a transparent electrode formed of ITO, etc.

In the non-display area NDA, the light-shielding body BM is disposed between the insulating substrate 200 and the alignment film 240, and includes the opening OP. The opening OP is formed at a position opposed to the photosensor 22. The second control electrode E2 is arranged between the insulating substrate 200 and the alignment film 240 in the opening OP. The second control electrode E2 can be formed of the same material as that of the common electrode CE. The common electrode CE and the second control electrode E2 are covered with the alignment film 240.

The liquid crystal layer LC is held between the first substrate SUB1 and the second substrate SUB2. The liquid crystal layer LC includes a first region LC1 between the photosensor 22 and the opening OP in the non-display area NDA, and a second region LC2 in the display area DA. The first region LC1 has a first thickness D1 between the alignment film 120 and the alignment film 240. The second region LC2 has a second thickness D2 between the alignment film 120 and the alignment film 240. The first thickness D1 is greater than the second thickness D2. In one example, the second thickness D2 is approximately 2 to 4 μm, and the first thickness D1 is approximately 10 to 20 μm. A difference between the first thickness D1 and the second thickness D2 is formed mainly by the insulating layer 210. A thickness D3 of the insulating layer 210 is less than the first thickness D1, and is greater than the second thickness D2. In one example, the thickness D3 is approximately 10 μm. In one example, the thickness D3 is three to four times greater than the second thickness D2.

As stated above, the first control electrode E1 and the second control electrode E2 apply a voltage for forming the first lens 5 to the first region LC1 of the liquid crystal layer LC. The first lens 5 is thereby formed directly above the photosensor 22. The first lens 5 converges the light incident through the second substrate SUB2 on the photosensor 22. The photosensor 22 outputs a signal according to the intensity of the received light.

Further, the pixel electrode PE and the common electrode CE apply a voltage to the second region LC2 of the liquid crystal layer LC. Consequently, a retardation of the second region LC2 is changed. More specifically, in an off-state in which a voltage is not applied to the second region LC2 and an on-state in which a voltage is applied to the second region LC2, the alignment state of the liquid crystal molecules included in the liquid crystal layer LC differs, and the retardation is changed. In a reflective display device DSP in which the pixel electrode PE is a reflective electrode and the common electrode CE is a transparent electrode, by a difference in the retardation between the on-state and the off-state, the external light incident through the second substrate SUB2 is selectively reflected, and an image is displayed.

According to the display device DSP described above, on the basis of the output from the photosensor 22, the intensity of the external light incident on the display device DSP can be measured, and the display luminance of the display device DSP can be controlled in accordance with the intensity of the external light. For example, when the intensity of the external light is low, by increasing the luminance of the illumination light which illuminates the display device DSP from the side at the second substrate SUB2, visibility of the displayed image can be improved.

Further, on the basis of an output from the photosensor 22, the incident direction of light can be determined likewise the photodetector PDT described above. Accordingly, the display device can be oriented in a direction which allows an observer to easily visually recognize the display device DSP. For example, when the external light is regularly reflected by the display device DSP, by controlling the orientation of the display device DSP such that a light source of the external light is not visually recognized by the observer, the visibility of the displayed image can be improved. Further, as a method of controlling the orientation of the display device DSP, the example of control of the solar system SSYS explained with reference to FIGS. 14 and 15 can be applied.

As described above, according to the present embodiment, a photodetector and a display device which are small in size and low in cost can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
   a first substrate comprising a photosensor, a plurality of first control electrodes, and a pixel electrode;
   a second substrate comprising a light-shielding body including an opening opposed to the photosensor, a second control electrode arranged at the opening, a common electrode, and a transparent insulating layer arranged in the second region; and
   a liquid crystal layer held between the first substrate and the second substrate,
   the liquid crystal layer including a first region between the photosensor and the opening, and a second region between the pixel electrode and the common electrode,
   wherein a first thickness of the first region is greater than a second thickness of the second region, and
   the transparent insulating layer has a thickness greater than the second thickness.

2. The display device of claim 1, wherein the pixel electrode is a reflective electrode, and the common electrode is a transparent electrode.

3. The display device of claim 1, wherein the pixel electrode and the first control electrodes are located in a same layer, and are formed of a same material.

4. The display device of claim 1, wherein the common electrode and the second control electrode are formed of a same material.

* * * * *